(12) United States Patent
Lewerentz

(10) Patent No.: US 9,933,283 B2
(45) Date of Patent: Apr. 3, 2018

(54) ROBUST ROTARY ENCODER FOR POWER TOOL

(71) Applicant: ATLAS COPCO INDUSTRIAL TECHNIQUE AB, Stockholm (SE)

(72) Inventor: Jan Hans Tolly Lewerentz, Hägersten (SE)

(73) Assignee: ATLAS COPCO INDUSTRIAL TECHNIQUE AB, Stockholm (SE)

(*) Notice: Subject to any disclaimer, the term of this patent is extended or adjusted under 35 U.S.C. 154(b) by 146 days.

(21) Appl. No.: 14/892,179

(22) PCT Filed: Jun. 5, 2014

(86) PCT No.: PCT/EP2014/061744
§ 371 (c)(1),
(2) Date: Nov. 18, 2015

(87) PCT Pub. No.: WO2014/195424
PCT Pub. Date: Dec. 11, 2014

(65) Prior Publication Data
US 2016/0091343 A1    Mar. 31, 2016

(30) Foreign Application Priority Data

Jun. 7, 2013   (SE) ..................................... 1350697

(51) Int. Cl.
*G01D 5/20*        (2006.01)
(52) U.S. Cl.
CPC ................................. *G01D 5/2066* (2013.01)
(58) Field of Classification Search
None
See application file for complete search history.

(56) References Cited

U.S. PATENT DOCUMENTS

| 4,238,781 A * | 12/1980 | Vercellotti | G01D 5/2412 324/660 |
| 2010/0117631 A1* | 5/2010 | Inoue | H02K 24/00 324/207.24 |
| 2010/0181995 A1 | 7/2010 | Inoue | |

FOREIGN PATENT DOCUMENTS

JP    2012018086 A    1/2012

OTHER PUBLICATIONS

International Search Report (ISR) and International Preliminary Report on Patentability (IPRP) dated Aug. 13, 2014 issued in International Application No. PCT/EP2014/061744.

* cited by examiner

*Primary Examiner* — Jermele M Hollington
*Assistant Examiner* — Douglas X Rodriguez
(74) *Attorney, Agent, or Firm* — Holtz, Holtz & Volek PC

(57) ABSTRACT

A displacement sensor for a power tool includes: a stator element, having a first conductive pattern, and a rotor element, having a second conductive pattern, for relative movement along a measurement path, wherein the first and second conductive patterns are mutually inductively coupled so that the first conductive pattern receives an excitation signal and the second conductive pattern generates an intermediate signal. The intermediate signal indicates relative displacement between the stator and rotor elements, wherein the excitation signal is a constant amplitude high-frequency signal. A signal processor circuit receives and processes a single phase receive signal corresponding to the intermediate signal to provide an output signal indicating relative displacement between the rotor and stator elements. A phase detector circuit processes the single phase receive signal to detect a phase difference between the receive signal and a reference signal corresponding to the excitation signal to provide the output signal.

29 Claims, 8 Drawing Sheets

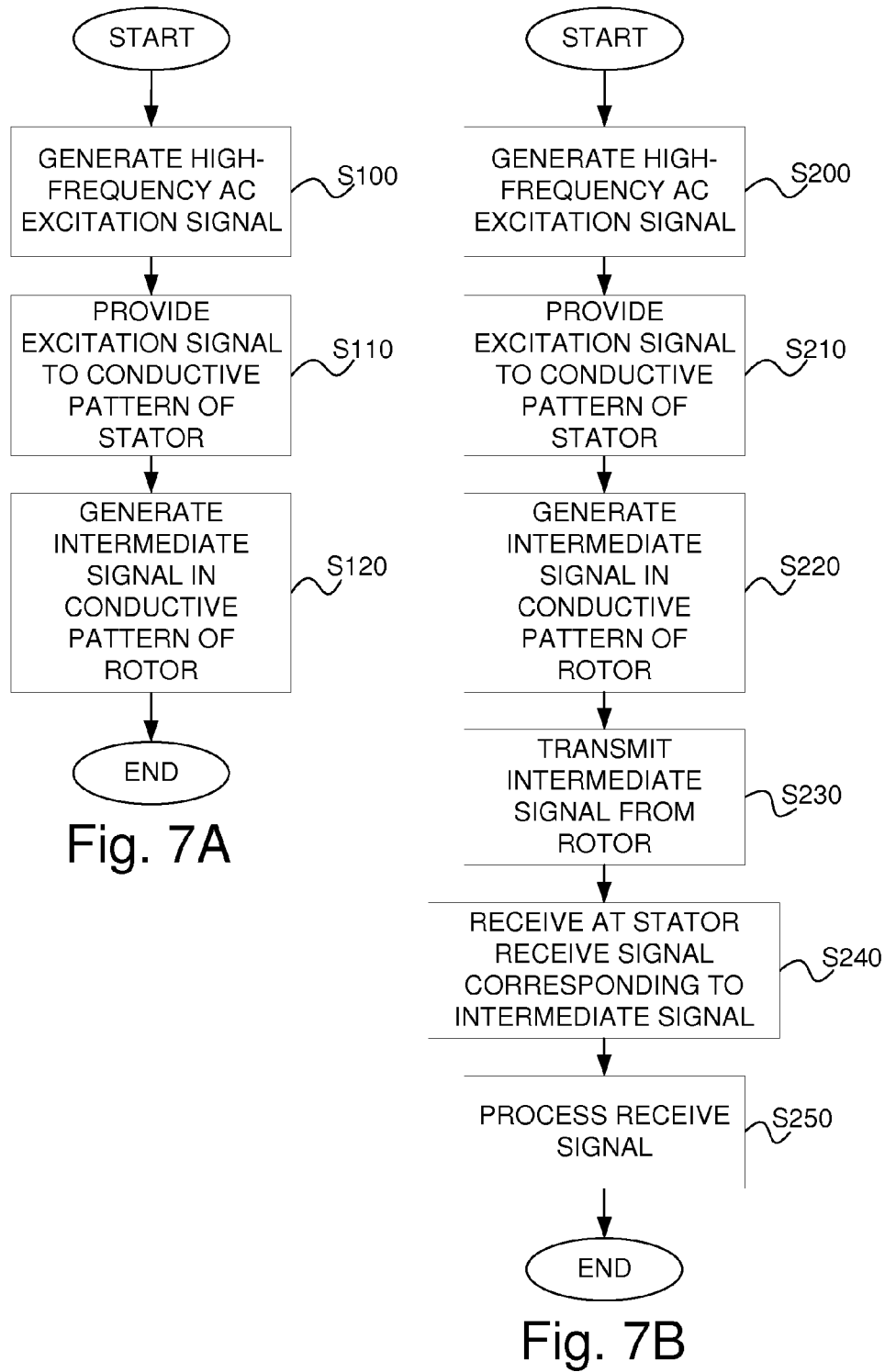

ROBUST ROTARY ENCODER FOR POWER TOOL

TECHNICAL FIELD

The present invention relates to a power tool with a sensor for sensing displacement and a method for sensing displacement within a power tool.

The present invention relates in particular to a power tool with an inductive type rotary encoder for sensing displacement between two relatively moveable parts of the power tool and a method for sensing displacement between two relatively moveable parts of the power tool using an inductive rotary encoder.

BACKGROUND

Power tools, such as screw drivers, nut runners, drills, are typically equipped with at least one detector arrangement of some form for sensing one or more parameter, such as for example relative angular displacement between two relatively moveable parts of the power tool. The one or more parameter may for example be used for monitoring purposes or feedback control.

The detector arrangements are depending on the application typically configured to measure either linear displacement or rotational displacement i.e. angular displacement.

The detector arrangements are also typically characterized as contact or non-contact detector arrangement depending if a physical contact with associated wiring to the relatively moveable measurement object is required or not by the detector arrangement.

Different detector arrangements are used today throughout a variety of different systems for sensing relative position i.e. displacement between two relatively moveable elements, such as between a rotatable element and a static element. These detector arrangements are typically referred to as synchros, resolvers, encoders, slip rings or transducers and operates based on physical sensing principles such as optical-, magnetic-, inductive-, capacitive- or eddy current physical sensing principles.

Optical detector arrangements typically implements a disc mounted on a rotatable measurement object such as a rotating shaft, wherein said disc is made of glass or plastic with transparent and opaque areas. These areas are exposed to light from a light source. The resulting light i.e. optical pattern is then received by a photo detector array which reads the optical pattern. The read optical pattern is then processed in order to obtain the position of the disc i.e. so as to provide the angle of the shaft.

Magnetic detector arrangements typically implements a series of equidistant magnetic poles provided in an alternating North-South pole configuration. The series of magnetic poles are mounted on a rotatable measurement object, such as a rotating shaft. A magnetic sensor (typically magneto-resistive or Hall Effect) then reads the magnetic pole positions. These positions can then be processed by a processing device so as to determine the angle of the shaft, in a similar to the above described optical detector arrangements.

Inductive detector arrangements typically implements inductive elements in the form of at least one first coil mounted on a rotatable measurement object, such as a rotating shaft, wherein said at least one first coil during rotation of the measurement object moves relative at least one second coil. By energising the at least one second coil, using alternating current (AC), a current is induced in the first coil due to mutual inductance. The degree of electrical connection between the at least one first coil and the at least one second coil being representative of the relative displacement between the at least one first coil and the at least one second coil.

Capacitive detector arrangements typically use a disc on a rotatable measurement object. Upon rotation of the measurement object the disc will change the capacitance between two electrodes of the capacitive detector arrangement, wherein said capacitance can be measured and processed to as to provide an indication of the angular displacement.

Eddy current detector arrangements typically uses a scale coded with high and low permeability, non-magnetic materials, which is detected and decoded by monitoring changes in inductance of an AC circuit that includes an inductive coil sensor.

However, the detector arrangements according to prior art tends to suffer from one or more of the following drawbacks: require large space, require complex circuit(s), cause high power consumption, are difficult to maintain, are costly to build, are sensitive to external magnetic fields, provides low accuracy and are prone to wear.

These drawbacks render unsuitable for use within a power tool since all these drawbacks adversely affects performance aspects and/or build costs for a power tool.

Accordingly, there is a need to present improvements in the art of detector arrangements for sensing relative displacement between relatively moveable parts of a power tool.

DESCRIPTION OF THE INVENTION

One object with the present invention is to provide a robust relative displacement sensor for a power tool.

One object is further to provide an accurate relative displacement sensor for a power tool.

One object is further to provide a small-sized relative displacement sensor, not requiring much space when mounted internally of a power tool.

Yet an additional object is to provide a relative displacement sensor that is less complicated and less costly than known techniques according to the prior art.

One or more of these objects are achieved by a displacement sensor for a power tool, according to the present invention as defined in claim 1. The displacement sensor comprises a stator element and a rotor element configured for relative movement along a measurement path. The stator element comprises a first conductive pattern and said rotor element comprises a second conductive pattern. The first conductive pattern and the second conductive pattern are mutually inductively coupled. The first conductive pattern is configured to receive an excitation signal. The second conductive pattern is configured to generate an intermediate signal therein caused due to mutual induction between the first conductive pattern and the second conductive pattern. The generated intermediate signal is indicative of the relative displacement between the stator element and the rotor element. The excitation signal is a high-frequency excitation signal having substantially constant amplitude.

The fact that that the excitation signal has a substantially constant amplitude may be defined in that the amplitude bears no information, i.e that no amplitude modulation is performed.

By this is achieved a displacement sensor for a power tool which is robust in terms of electromagnetic interferences since the excitation signal in terms of frequency is far from the frequencies typically associated to sources of electromagnetic interferences existing in the vicinity of a power tool. The phase of the intermediate signal will indicate the relative displacement, i.e. the relative angular displacement, between the rotor element and the stator element or in more detail the phase difference between the intermediate signal and the high-frequency excitation signal will indicate said relative position.

Furthermore, tolerance is increased with respect to later misalignment between the rotor and stator element. Also the distance between the stator element and the rotor element can be increased with maintained accuracy of the displacement sensor.

Also by means of using a high-frequency excitation signal the conductive patterns of the stator and rotor elements respectively can be implemented with relatively low amount of inductance included therein and still provide enough impedance to suit the configuration of the displacement sensor. This also allows constructing the respective conductive patterns to form conductive elements, i.e. coils, each surrounding relatively areas free of conductive material/ elements meaning that the conductive patterns can be implemented with relatively few turns per coil element.

Furthermore, the displacement sensor can be implemented with few circuitry components since only one signal, in the form of the intermediate signal, need to be considered when transforming sensor signal into a value indicating relative displacement between the rotor and stator element. This facilitates producing a displacement sensor with small form factor, low weight and low production cost. In contrast displacement sensors according to prior art typically uses several receive signals, each needing decoding performed with dedicated decoding circuitry in order output a value indicating relative displacement.

The displacement sensor is in one option further characterized in that the high-frequency signal is a signal having a frequency selected from a frequency range of 100 KHz-100 MHz.

The displacement sensor is in one option further characterized in that the high-frequency signal is a signal having a frequency selected from a frequency range of 1 MHz-10 MHz.

The displacement sensor is in one option further characterized in that the excitation signal is configured to be a multi-phase excitation signal comprising a plurality of high-frequency excitation signals, each having a phase of plurality of phases.

By this is achieved a displacement sensor for a power tool wherein the displacement sensor has improved robustness in terms of tolerance against disturbances and wherein receiving circuitry of the displacement sensor can be manufactured with less complex circuitry. In more detail by means of utilizing a multi-phase excitation signal the circuitry on the receiving side of the displacement sensor can be made less complex. Apart from enabling implementing less complex circuitry on the receiver side of the displacement sensor the displacement sensor is also made more robust by means of using the multi-phase excitation signal since only a single receiver/decoder circuit is required on the receiver side. This is in contrast to displacement sensors according to prior art which typically requires two separate receiver/decoder circuits on the receiver side. Using only a single receiver/decoder circuit on the receiver side makes the displacement sensor more robust against disturbances as compared to using two receiver/decoder circuits. Such disturbances affecting the receiver side of the displacement sensor can have a severe impact for displacement sensors and in particular for displacement sensors having two receiver/decoder circuits since the signal strength on the receiver side typically is quite weak and therefore also more sensitive to disturbances which may affect each of the two receiver/decoder circuits differently. The displacement sensor according to the present invention on the other hand is capable of accurately operating in an unscreened fashion in close proximity to power cables, such as power cables associated to a motor of a power tool, in which currents amounting to at least 60 ampere (A) flows.

The displacement sensor is in one option further characterized in that the multi-phase excitation signal is a four-phase excitation signal having four phases comprising a 0 degree phase, a 90 degree phase, a 180 degree phase and a 270 degree phase.

By this is achieved a displacement sensor for a power tool wherein the multi-phase excitation signal can be generated in an efficient fashion since the 0° phase and 90° phase simply can be inverted to generate the 180° and 270° phases of the multi-phase excitation signal. This configuration of the multi-phase excitation signal also facilitates phase matching in terms of the configuration of the first conductive pattern of the stator element and the second conductive pattern of the rotor element. For example in case the configuration of the second conductive pattern is configured to form an alternating two-phase pattern comprising a 0° phase and a 180° phase, i.e. alternating phase and anti-phase pattern, then the phases, 0° and 180°, of the multi-phase excitation signal can be fed to the first conductive pattern so that portions of the first conductive pattern, being fed with 0° phase of the multi-phase excitation signal, faces portions of the second conductive pattern, configured to form a 0° phase, jointly with portions, of the first conductive pattern being fed with a 180° phase, facing portions of the second conductive pattern configured to form a 180° phase.

The displacement sensor is in one option further characterized in that the multi-phase excitation signal is a three-phase excitation signal having three phases comprising a 0 degree phase, a 120 degree phase and a 240 degree phase.

By this is achieved a displacement sensor for a power tool wherein the displacement sensor with facilitated relative displacement sensing of relatively moving parts associated to a three-phase motor by means of using a multi-phase excitation signal having three phases.

The displacement sensor is in one option further characterized in that the first conductive pattern of the stator element comprises a series of drive coils extending along a measurement path of the stator element. The series of drive coils is arranged in a periodically repeating phase pattern. The phase pattern is repeated n times along the measurement path. Each drive coil of the periodically repeating phase pattern is configured to be fed with a phase of the multi-phase signal.

The displacement sensor is in one option further characterized in that each drive coil of the periodically repeating phase pattern is configured to be fed with a phase, of the multi-phase excitation signal, incrementally increasing in consecutive order of the drive coils of the periodically repeating phase pattern.

The displacement sensor is in one option further characterized in that the second conductive pattern of the rotor element comprises a series of balanced receive coils being connected in series and extending along a measurement path of the rotor element, said measurement path of the rotor element facing the measurement path of the stator element.

The displacement sensor is in one option further characterized in that each receive coil of the series of receive coils is configured to define a periodically repeating balanced, alternating two-phase pattern, which is repeated i−1 times along the measurement path so that adjacent loops of each receive coil of the series of receive coils are in anti-phase.

By this is achieved a displacement sensor for a power tool wherein the disturbances generated from external magnetic fields effectively can be removed from appearing in the intermediate signal.

The displacement sensor is in one option further characterized in that the rotor element further comprises a balanced drive coil. The balanced drive coil is configured to be coupled to the second conductive pattern and to transmit the intermediate signal to a balanced receive coil of the stator element by means of mutual induction formed between the balanced drive coil and the balanced receive coil.

By this is achieved a displacement sensor for a power tool wherein the effect of far field disturbances is reduced since the drive coil is balanced, and since the receive coil is balanced. The displacement sensor is in one option further characterized in that each of the balanced drive coil and the balanced receive coil comprises two coil sections respectively. Said two coil sections are configured so that current flowing in the two coil section flows in opposite directions in relation to each other along the measurement path of the rotor and stator element respectively.

By this is achieved a displacement sensor for a power tool wherein the disturbances generated from external magnetic field effectively can be removed from appearing in the intermediate signal upon transmission of the intermediate signal from the rotor element to the stator element.

The displacement sensor is in one option further characterized in comprising a signal generator circuit. The signal generator circuit is coupled to the first conductive pattern of the stator element. Said signal generator being configured to generate the excitation signal and provide the excitation signal to the first conductive pattern so as to energise said first conductive pattern.

The displacement sensor is in one option further characterized in comprising a single phase signal processor circuit. The signal processor circuit is configured to receive and process a single phasereceive signal, corresponding to the intermediate signal received at the stator element, so as to provide an output signal indicative of the relative displacement between the rotor element and the stator element.

The displacement sensor is in one option further characterized in that the single phase signal processor circuit comprises a phase detector circuit configured process the receive signal in order to detect a phase difference between the receive signal and the excitation signal so as to provide said output signal.

Due to the fact that the amplitude is kept substantially constant, i.e. that no amplitude modulation is performed, the demodulation step at the reception side may be dispensed with. Further, since the excitation signal has a high frequency no frequency adjustment needs to be done to detect the phase, which is preferably done at a high frequency in order be able to use small components.

By this is achieved a displacement sensor for a power tool wherein the displacement sensor is tolerant against amplitude modulated disturbances since such disturbances do not affect the phase difference.

The displacement sensor is in one option further characterized in that the phase detector circuit is an I/Q demodulator circuit configured to output two quadrature signals, indicative of phase difference of said receive signal and said excitation signal.

By this is achieved a displacement sensor for a power tool wherein the displacement sensor with improved displacement sensing since an IQ-demodulator in a simple and robust fashion can detect a phase difference, such as detect the phase difference between the reference signal and the receive signal. Apart from ease of detection and robustness the use of an IQ-demodulator also provides cost efficiency in terms of manufacture of the displacement sensor since the IQ-demodulator can be manufactured at a relatively low cost.

The displacement sensor is in one option further characterized in that the rotor element is configured for attachment to a first moveable part of the power tool and wherein the stator element is configured for attachment to a second stationary part of the power tool.

By this is achieved a displacement sensor for a power tool wherein the displacement sensor is enabled to sense the relative displacement between the first moveable part and the second stationary part of the power tool.

The displacement sensor is in one option further characterized in that the rotor element and the stator element are shaped as annular discs.

The displacement sensor is in one option further characterized in that wherein the rotor element and the stator element each is formed of a printed circuit board with conductive traces forming the first conductive pattern and the second conductive pattern respectively.

By this is achieved a displacement sensor for a power tool wherein the stator and rotor elements and its associated conductive elements can be manufactured in a cost efficient fashion.

The displacement sensor is in one option further characterized in that the rotor element comprises at least one capacitance component configured to provide noise suppression.

By this is achieved a displacement sensor for a power tool wherein the noise affecting the intermediate signal effectively can be suppressed.

The displacement sensor is in one option further characterized in that the rotor element comprises at least one capacitance layer forming at least one capacitor so as to provide noise suppression.

By this is achieved a displacement sensor for a power tool wherein the noise affecting the intermediate signal effectively can be suppressed and that the capacitor in the form of the capacitance layer is protected from mechanical impacts.

One or more of these objects are also achieved by a method for sensing displacement, between two relatively moveable parts of a power tool. The method comprises the step of generating an excitation signal in the form of a high-frequency excitation signal having substantially constant amplitude. A further method step comprises providing the excitation signal to a first conductive pattern of a stator element. A further method step comprise generating an intermediate signal in a second conductive pattern of a rotor element due to mutual induction between the first conductive pattern and the second conductive pattern. Said intermediary signal is indicative of the relative displacement between the rotor element and the stator element.

The dependent claims define optional characterizing features corresponding to those described in relation to the system.

DESCRIPTION OF THE DRAWINGS

The present invention will now be described in embodiments in more detail, with reference to the accompanying drawings, without limiting the interpretation of the invention thereto, where FIG. 1. shows schematically a power tool with a rotary encoder according to an embodiment of the present invention;

FIG. 7A. shows a flow diagram of a method for sensing displacement between two relatively moveable parts of a power tool according to an embodiment of the present invention; and FIG. 7B. shows a flow diagram of a method for sensing displacement between two relatively moveable parts of a power tool in more detail according to an embodiment of the present invention.

DETAILED DESCRIPTION OF EMBODIMENTS

Figure 1:
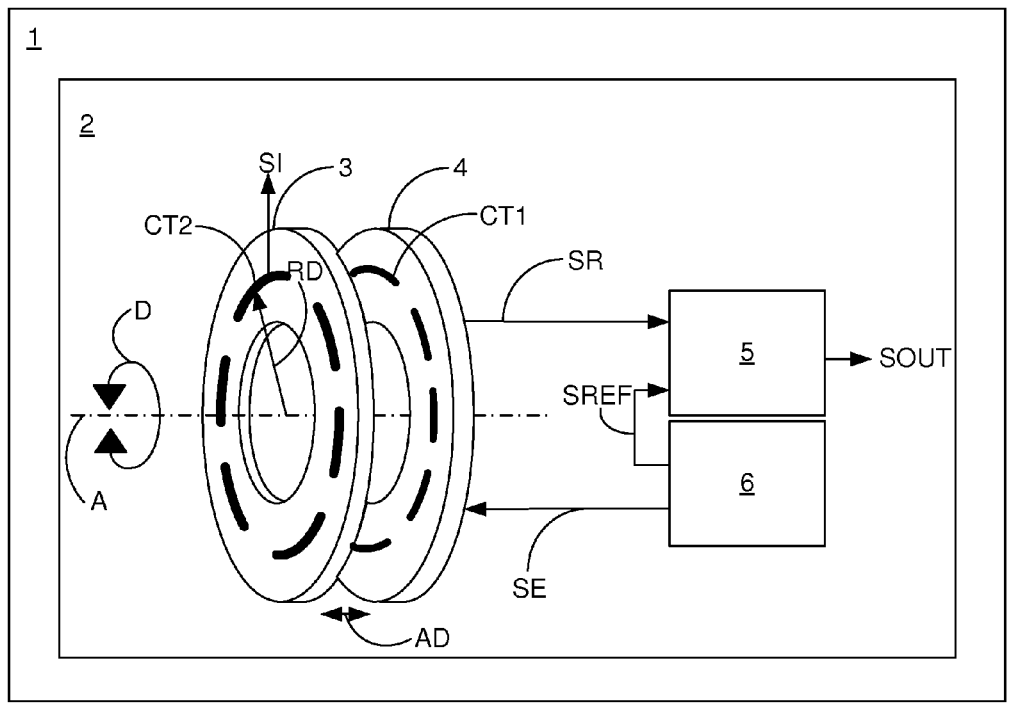

The figures are schematic and simplified for clarity reasons, and they merely show details which are essential to the understanding of the invention, while other details have been left out. Throughout the following description, the same reference numerals are used for identical or corresponding parts or steps.

With reference to FIG. 1 a power tool 1 having a displacement sensor, in the form of an inductive rotary encoder 2, is disclosed according to an embodiment of the present invention. The inductive rotary encoder 2 comprises a stator element 4 and a rotor element 3. The stator element 4 and the rotor element 3 are configured to be mounted concentric around an axis A, such as mounted concentric around an axis A extending in an axial direction of a shaft of the power tool 1. The stator element 4 and the rotor element 3 are further configured to be mounted at an axial distance AD from each other. This means that an air gap is formed between the stator element 4 and the rotor element 3.

The stator element 4 is configured for attachment to a stationary part (not shown) of the power tool 1. The stationary part of the power tool may be a support structure or housing for a moveable part (not shown) of the power tool. As an example the support structure or housing of the power tool 1 may be a support structure or housing for a moveable part in the form of a rotatable shaft extending along the axis A, wherein said rotatable shaft is configured for rotation back and/or forth around the axis A in direction D. The rotor element 3 is configured for attachment to a moveable part of the power tool 1, such as configured for attachment to the above exemplified rotatable shaft. This means that the rotor element 3 by means of being attached to a moveable part jointly moves with the moveable part while the stator element 4 remains stationary by means of being attached to a stationary part. Thus, upon movement of the moveable part of the power tool 1 the rotor element 3 will be displaced relative to the stator element 4. In case the rotor element 3 is attached to the above exemplified rotatable shaft, the rotor element 3 will be angularly displaced relative the stator element 4 upon movement of the rotatable shaft.

The rotor element 3 and the stator element 4 are shaped as annular laminar discs. The rotor element and/or the stator element may further be provided with at least one central aperture, such as a through-hole, configured for receiving at least one part of the power tool 1, for example a shaft of the power tool.

The stator element 4 comprises a first conductive pattern or track CT1. In more detail the first conductive pattern CT1 is formed in the stator element 4. The rotor element 3 comprises a second conductive pattern or track CT2. In more detail the second conductive pattern CT2 is formed in the rotor element 3. The first and second conductive patterns CT1, CT2 are formed in the stator element and rotor element respectively at a radial distance RD. Thus, since the first and second conductive pattern CT1, CT2 are preferably positioned at the same radial distance RD and since both the stator element 4 and the rotor element 3 are configured for being mounted concentric around the axis A the first and second conductive patterns CT1, CT2 will be configured so as to face each other over said air gap.

Preferably the stator element 4 and the rotor element 3 are each made of a substrate, such as an electrically insulating substrate. In more detail the stator element 4 and the rotor element 3 are preferable printed circuit boards (PCB) with copper traces forming the conductive patterns with associated electrical connectors, i.e. the conductive patterns are conductive patterns printed on the PCB. This provides good mechanical support for the conductive patterns as well as good electrical insulation.

More details about the configurations of the first conductive pattern CT1 and the second conductive pattern CT2 will be explained with reference to FIG. 3 and FIG. 4 respectively.

The stator element 4 is configured to be driven, meaning that it has at least one terminal or connector with associated wiring (not shown) configured to be coupled to an energy source, in the form of a signal generator 6. The rotor element 3 on the other hand is configured to be passive i.e. the rotor element 3 has no terminal or connector with associated wiring configured for connection to an energy source. Rather, the second conductive pattern of the rotor element 3 will be energised by means of mutual inductance occurring between the first conductive pattern CT1 of the stator element 4 and the second conductive pattern CT2 of the rotor element 3 upon energisation of the first conductive pattern CT1 of the stator element 4.

The signal generator circuit 6 is configured to energise the first conductive pattern CT1 of the stator 4 by means of generating a high-frequency excitation signal SE with substantially constant amplitude. The high-frequency excitation signal is an alternating current (AC) signal. More details about the signal generator circuit will be explained with reference to FIG. 2. Due to mutual inductance between the first conductive pattern CT1 of the stator element 4 and the second conductive pattern CT2 of the rotor element 3 a current will be induced in the second conductive pattern CT2 when the first conductive pattern CT1 is energised by said high-frequency excitation signal SE resulting in that an intermediate signal SI is formed in the second conductive pattern of the rotor element 3. Upon movement of the rotor element 3 relative the stator element 4 the intermediate signal SI resulting from the induced current will be phase shifted or phase modulated relative the excitation signal SE whereby information indicative of the relative displacement between the stator element 4 and the rotor element 3 will be provided. This will be explained in more detail with reference to FIG. 5A and FIG. 5B.

The stator element 4 is further configured to be coupled to a signal processor circuit 5. The signal processor circuit 5 is configured to receive a receive signal SR, corresponding to the intermediate signal SI transmitted, from the rotor element and received at the stator element over the air gap, via transmit means and receiving means of the rotor and stator element 3, 4 respectively. Transmission of the intermediate signal SI from the rotor element to the stator element will not introduce any substantial change of the intermediate signal SI which means that the receive signal SR will have substantially the same phase as the intermediate signal. The transmit means and receiving means will be explained in more detail with reference to FIG. 4 and FIG. 3 respectively. The signal processor circuit 5 is configured to process said receive signal SR so as to calculate and output information SOUT relating to the relative displacement, such as the relative angular displacement, between the rotor element 3 and the stator element 4. The output information SOUT may be provided by the signal processor circuit 5 as an analogue or digital signal in the form of a quadrature signal being indicative of the relative displacement between the rotor element and the stator element. The processor circuit 5 is further configured to receive a reference signal SREF from the signal generator circuit 6. The signal processor circuit is configured to utilize the reference signal in conjunction with processing of the receive signal SR so as to provide the output information. More details of the signal processor circuit 5 and signal outputted by the signal processor circuit will be explained with reference to FIG. 6.

According to an embodiment the signal processor circuit 5 is configured to provide the output information SOUT in the form of an increment signal.

According to an embodiment the signal processor circuit 5 is configured to provide the output information SOUT in the form of an absolute signal.

According to an embodiment the outer diameter of the stator element 4 and the rotor element 3 is configured to be selected from an interval ranging from 10-500 mm. For example the outer diameter of the stator element 4 and the rotor element 3 may be selected to be around 40 mm.

The power tool 1 comprising the rotary encoder 2 may be a power tool 1 driven by an electric motor, a combustion engine or compressed air i.e. pneumatic power tool. The power tool 1 may be a power tool selected from a group of power tools comprising: a nut runner, a pulsating nut runner, a screwdriver, a wrench and a drill.

Figure 2:
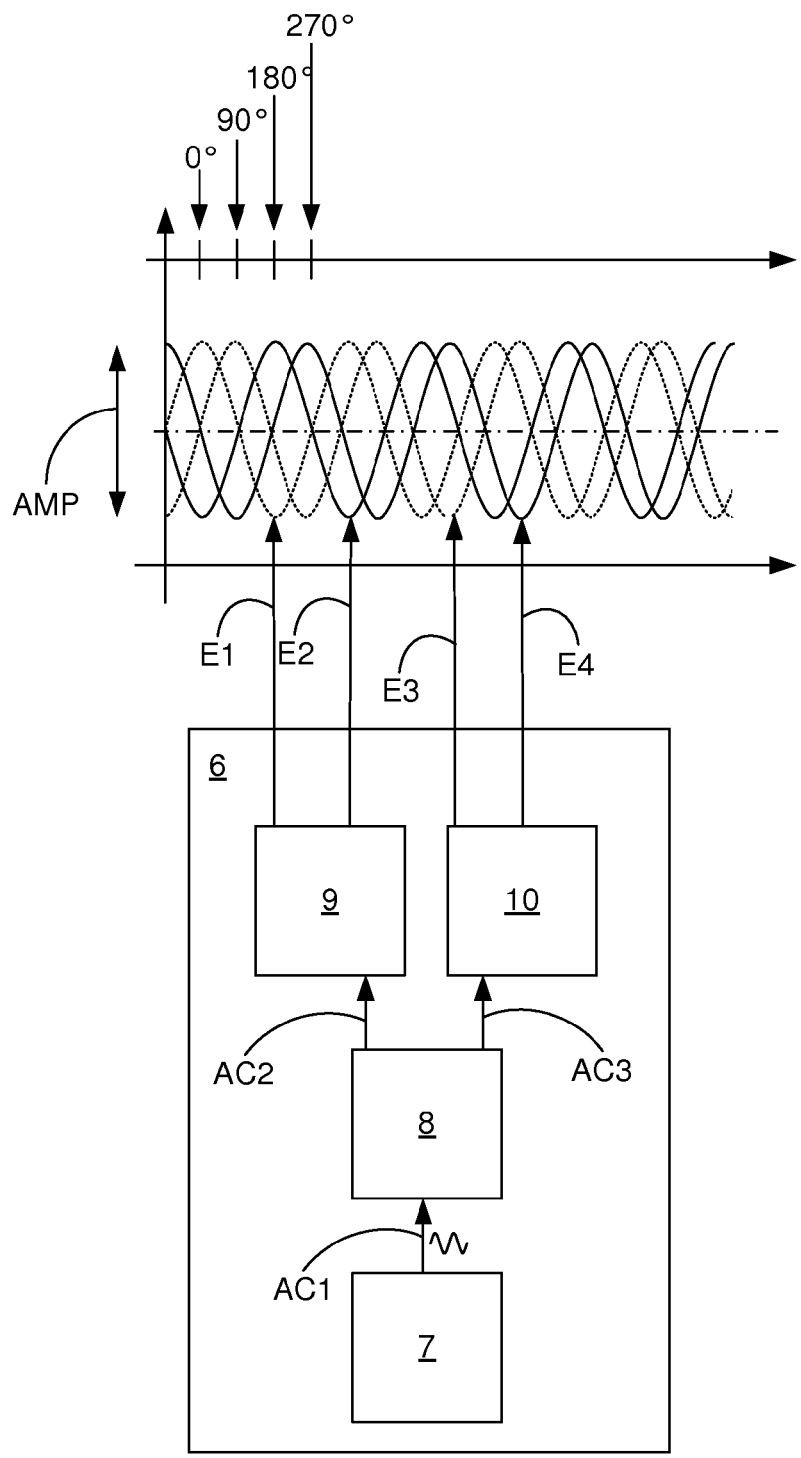
FIG. 2. shows schematically a block diagram of signal generator circuit according to an embodiment of the present invention.

With reference to FIG. 2 a signal generator circuit for a rotary encoder according to an embodiment of the present invention is illustrated.

The signal generator circuit 6 comprises an alternating current (AC) power source 7, also referred to as an AC high-frequency oscillator 7, configured to generate a high-frequency signal AC1 with substantially constant amplitude. With a signal having substantially constant amplitude is meant a signal exhibiting at the most small variations in amplitude over time, such as small variations caused by performance limitations of the oscillator or by noise affecting the signal, and a signal that has not been subjected to any form of amplitude modulating (AM) operations. The AC power source 7 comprises a circuit for controlling the frequency of the high-frequency signal AC1. The AC power source is further configured to generate a high-frequency signal AC1, with substantially constant amplitude AMP, having a periodic wave form. The high-frequency signal AC1 generated by the AC power source have a frequency in the range of 100 KHz to 100 MHz.

According to an embodiment the high-frequency signal AC1 is generated so that it has a sinusoidal wave form.

According to an embodiment the high-frequency signal AC1 generated by the AC power source have a frequency above 100 KHz.

According to an embodiment the high-frequency signal AC1 generated by the AC power source have a frequency above 1 MHz According to an embodiment the high-frequency signal AC1 generated by the AC power source is periodic.

According to an embodiment the high-frequency signal AC1 is generated so that it has a single frequency, such as a single frequency within any of the above mentioned frequency ranges.

According to a preferred embodiment the high-frequency signal AC1 generated by the AC power source have a frequency in the range of 1 MHz to 10 MHz, such as 2.5 MHz. Preferably the frequency of the high-frequency signal AC1 is arranged so that it is far removed from frequencies other signals existing in the vicinity of the power tool such as signals generated by electric/magnetic components located internally or externally of the power tool. This effectively reduces the influence these signals have on sensing process. Also this reduces disturbances produced by the rotary encoder which may affect other components internally or externally of the power tool. According to a variant a spread spectrum modulation may be added to the signal AC1 so as to further minimize disturbances.

The signal generator circuit 6 further comprises a phase shifter circuit 8 coupled to the AC high-frequency oscillator 7. The phase shifter circuit 8 is configured to receive the high-frequency signal AC1 generated by the AC high-frequency oscillator 7. The phase shifter circuit 8 is further configured, based on the received high-frequency signal AC1, to generate and output a multi-phase signal, i.e. a signal comprising a plurality of high-frequency signals AC2, AC3, each having a phase of a plurality of phases. Preferably the plurality of phases are each different from each other.

In the illustrated example with reference to FIG. 2, the phase shifter circuit 8 is configured to generate and output two high-frequency signals AC2 and AC3 of which the high-frequency signal AC3 is in quadrature with the high-frequency signal AC2. The term "quadrature" is used to define that the signal AC3 is phase shifted relative the high-frequency signal AC1. In more detail a quadrature signal of a signal is separated in phase by 90° ($\pi/2$, or $\lambda/4$). Thus, the signal AC3 is phase shifted relative the high-frequency signal AC1 by 90°. Apart from outputting the quadrature signal AC3 the quadrature circuit 8 is also configured to output a high-frequency signal AC2, corresponding to the received high-frequency signal AC1 i.e. with no phase shift.

It should be noted that the phase shifter circuit 8 may be configured differently than in the example illustrated with reference to FIG. 2. For example the phase shifter circuit 8 may be configured to generate more than two high-frequency signals having a plurality of phases, such as for example three or six high-frequency signals each having different phases. Also the phase separation between the phases of the plurality of high-frequency signals may be different than 90°. The phase shifter circuit 8 may for example be configured to generate and output three high-frequency signals one of which has a 0° phase shift in relation to the high-frequency signal AC1, one of which has a 120° phase shift in relation to the high-frequency signal AC1 and one of which has a 240° phase shift in relation to the high-frequency signal AC1.

Furthermore, the phases of the plurality of high-frequency signals generated by the phase shifter circuit does not necessarily need to form geometric series i.e. be multiples of a constant angular phase shift.

With further reference to the illustrated example with reference to FIG. 2 the signal generator circuit 6 further comprises two coil drivers 9, 10 configured to be coupled to the phase shifter circuit 8. A first coil driver 9 of the two coil drivers is configured for receiving the signal AC2. A second coil driver 10 of the two coil drivers is configured for receiving the signal AC3. The first coil driver 9 is further configured to generate and output a first excitation signal E1 and a second excitation signal E2. The second coil driver 10 is further configured to generate and output a third excitation signal E3 and a fourth excitation signal E4. Said first, second, third and fourth excitation signals forming a multi-phase excitation signal i.e. a plurality of excitation signals each having a phase of a plurality of phases, each of said phases being a phase which is phase shifted a predetermined number of degrees from the high-frequency signal AC1. The first excitation signal E1 being a high-frequency signal with substantially constant amplitude corresponding to the signal AC2. The second excitation signal E2 being a high-frequency signal with substantially constant amplitude corresponding to a phase shifted version of the signal AC2, wherein the second excitation signal E2 being phase shifted by 180° relative to the signal AC2. The third excitation signal E3 being a high-frequency signal with substantially constant amplitude corresponding to the signal AC3. The fourth excitation signal E4 being a high-frequency signal with substantially constant amplitude corresponding to a phase shifted version of the signal AC3, wherein the fourth excitation signal E4 being phase shifted by 180° relative to the signal AC3. Accordingly, in relation to the first excitation signal E1, the third excitation signal E3 is phase shifted by 90°, the second excitation signal E2 is phase shifted by 180° and the fourth excitation signal E4 is phase shifted by 270°. This means that the phase of the multi-phase signal comprising the first, the second, the third and the fourth excitation signal successively increases in phase with 90°, i.e. is incrementally increasing in phase with 90°, in the order of E1-E3-E2-E4. This also means that: the third excitation signal E3 is in quadrature phase with the first excitation signal E1; the second excitation signal E2 is in quadrature phase with the third excitation signal E3; and the fourth excitation signal E4 is in quadrature phase with the second excitation signal E2. The two coil drivers of the signal generator circuit 6 may be differential amplifier circuits each with two outputs of which one have reversed polarity.

The signal generator circuit 6 is further configured to be coupled to the stator element 4 so as to provide said excitation signal, in the form of the multi-phase excitation signal to the first conductive pattern of the stator element 4 causing energisation or excitation of the first conductive pattern of the stator element 4. More details on how the signals generated by the signal generator circuit 6 propagate in the stator element 4 will be explained with reference to FIG. 3.

It is to be noted that the signal generator circuit 6 exemplified with reference to FIG. 2 may be configured differently. For example the signal generator circuit 6 may be configured to generate fewer or more output signals E1-E4 to be provided to the stator element 4. In case the signal generator circuit is configured to generate fewer or more output signal, i.e. excitations signals E1-E4, than in the illustrated example then the signal generator may comprise fewer or more coil drivers. As an example according to an embodiment of the invention the signal generator circuit comprise one coil driver per generated excitation signal. According to an embodiment the signal generator circuit is configured to generate and output an excitation signal having a 0° phase, an excitation signal having a 120° phase and an excitation signal having a 240° phase shift. In this embodiment the signal generator comprise three coil drivers i.e. one per generate excitation signal. Also the signal generator circuit 6 may comprise power amplifier circuits configured to amplify signals outputted by the signal generator circuit 6.

Figure 3:
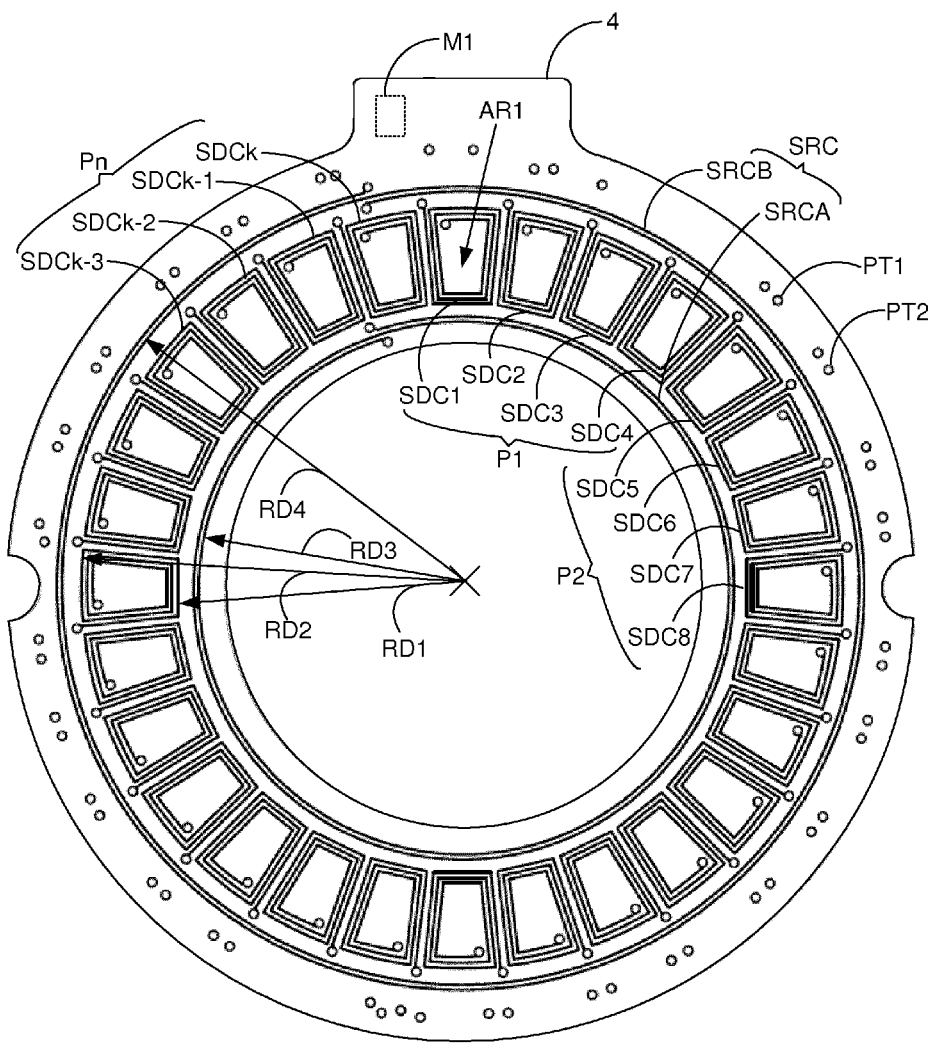
FIG. 3. shows schematically a plane view of a stator of a rotary encoder according to an embodiment of the present invention.

With reference to FIG. 3 a stator element of an inductive rotary encoder according to an embodiment of the present invention is illustrated.

The stator element 4 of the rotary encoder, such as the rotary encoder 2, exemplified with reference to FIG. 1, comprises a first conductive pattern, such as a first conductive pattern CT1, in the form of a series of drive coils SDC1-SDC8, . . . , SDCk-3, SDCk-2, SDCk-1, SDCk, i.e. SDC1-SDCk. Thus, the series of drive coils comprises a number k of drive coils. The series of drive coils SDC1-SDCk are arranged equidistant, i.e. the distance between each drive coil and an adjacent drive coil of the series of drive coils is equal. The series of drive coils SDC1-SDCk are further arranged in the stator element 4, such as arranged integrated in an annular disc shaped stator element as exemplified with reference to FIG. 1, along a circumferential direction of the stator element 4. This means that the series of drive coils SDC1-SDCk are arranged to form a measurement path, extending along the circumferential direction of the stator element 4. Each drive coil of the series of drive coils SDC1-SDCk are further arranged in the stator element at predetermined first radial distance RD1 from the centre of the stator element 4 and extending outwards to a second radial distance RD2 of the stator element 4. Each drive coil of the series of drive coils SDC1-SDCk is arranged with its main direction of extension aligned to the main direction of extension of the stator element i.e. arranged to extend in a plane formed of the main direction of extension of the stator element 4, along which the measurement path is extending.

Each drive coil of the series of drive coil SDC1-SDCk comprises a winding, having spiral or serpentine windings, forming a loop arranged in an inwardly/outwardly spiraling pattern. Preferably, the shape of the inwardly/outwardly spiraling pattern is configured so that side sections of the inwardly/outwardly spiraling pattern extending substantially along the radial direction of the stator element are substantially aligned with the radial direction of the stator element, i.e. substantially shaped as straight lines, and so that side sections of the inwardly/outwardly spiraling pattern extending in an substantially annular direction of the stator element have a curvature, substantially matching the curvature of the substantially annular stator element, i.e. the side sections of the inwardly/outwardly spiraling pattern extending in an annular direction of the stator element are curved outwardly in the radial direction of the stator element so as to substantially match curvature of the stator element. This also means that each segment of an individual side section, of the side sections of the inwardly/outwardly spiraling pattern extending in an annular direction of the stator element, is arranged at substantially the same radial distance from the centre of the stator element. The winding have two end points, each configured to be coupled to a terminal of the stator element 4. The winding of each drive coil of the series of drive coils SDC1-SDCk have a predetermined number of turns. Preferably the predetermined number of turns in each winding is between 2-5 turns.

Each drive coil of the series of drive coils SDC1-SDCk of the stator element 4, such as the drive coil SDC1, surround an area AR1 having a predetermined size. Said area AR1 being configured to be free of any form of conductive elements, such as windings.

The stator element 4 is configured to be coupled to a signal generator circuit, such as the signal generator circuit 6 exemplified with reference to FIG. 1 or FIG. 2. The stator element 4 is further configured to be coupled to a signal processor circuit, such as the signal processor circuit 5 exemplified with reference to FIG. 1 or FIG. 6. In more detail the stator element 4 is configured to be coupled to the signal generator circuit 6 and the signal processor circuit 5 via at least one main input/output terminal M1. This means that the stator element 4 is enabled to receive information, in the form of an excitation signal SE, such as the multi-phase high frequency excitation signal having substantially constant amplitude, from the signal generator circuit 6 and to enabled to transmit information to the signal processor circuit, such as transmit information relating to a receive signal SR, corresponding to the intermediate signal SI, caused in the second conductive pattern CT2 of the rotor element 3 due to mutual induction, received via receiving means of the stator element 4.

The stator element 4 further comprises a plurality of peripheral i.e. terminals, of which two peripheral terminals with references PT1, PT2 are illustrated in FIG. 3, arranged around the periphery of the stator element 4. These peripheral terminals are configured to supply or feed the excitation signal to each drive coil of the series of drive coils of the stator element 4.

Each drive coil of the series of drive coils SDC1-SDCk are configured with two terminals or leads, illustrated as circles in FIG. 3. The two terminals at the end point of each of the drive coils are configured to be coupled to two terminals, of the stator element 4. This enables providing each of the drive coils with the high-frequency excitation signal SE, such with a phase of a high-frequency multi-phase excitation signal E1-E4 or in more detail one of the excitations signal E1-E4 having a certain phase, generated by the signal generator circuit 6 as exemplified with reference to FIG. 1 or FIG. 2.

According to a preferred embodiment the series of drive coils SDC1-SDCk of the stator element 4 are configured to form a periodically repeating phase pattern P1 which is repeated n times along the measurement path of the stator element 4, wherein n is an integer number, ranging upwardly from zero, denoting the number of times the repeating phase pattern P1 is repeated, i.e. repeated along the measurement path of the stator element 4. This means that a plurality of successive or consecutive drive coils SDC1-SDCk, such as a predetermined number of consecutive of drive coils of the series of drive coils of the stator element form the phase pattern, for example the phase pattern P1 which is repeated n time along the measurement path so that the that series of drive coils is arranged to comprise the phase patterns P1-Pn. As an example in case n equals zero the series of drive coils SDC1-SDCk of the stator element 4 are configured to form a single phase pattern P1 which is repeated zero times i.e. the series of drive coils SDC1-SDCk of the stator element 4 are arranged in a single phase pattern P1 along the measurement path of the stator element. As another example in case n equals two the series of drive coils SDC1-SDCk of the stator element 4 are configured to form a phase pattern P1 which is repeated two times along the measurement path of the stator element 4, i.e. the repeating phase pattern appears three time along the measurement path of the stator element 4 including the phase pattern P1 itself.

The drive coils of the phase pattern are configured to be fed with a phase of the high-frequency multi-phase excitation signal SE or in more detail one excitation signal E1-E4 of the multi-phase high frequency excitation signal SE having a plurality of excitation signals E1-E4 so that adjacent drive coils of the phase pattern receive a phase of the high-frequency multi-phase excitation signal SE being separated in phase relative a neighbouring drive coil of the phase pattern. This can also be expressed by that the phase of the excitation signal configured to be fed to the drive coils of the phase pattern being phase shifted, such as incremented in phase, in consecutive order of the drive coils forming the phase pattern.

In the illustrated example four consecutive drive coils SDC1-SDC4, SDC5-SDC8, ..., SDCk-3-SDCk of the series of drive coils form the repeating phase pattern which is repeated seven times i.e. n equals sevens. In more detail the drive coils SDC1-SDC4 form a phase pattern P1, the drive coils SDC5-SDC8 form the phase pattern P2 being the first periodic repetition of the phase pattern P1 and the drive coils SDCk-3-SDCk form the phase pattern Pn being the $n^{th}-1$ repetition of the phase pattern P1 so that the series of drive coils form n numbers of repetitions of the periodically repeating phase pattern P1, including P1.

According to a preferred embodiment the repeating phase pattern is a four-phase quadrature pattern repeated n times along the measurement path of the rotor element 3, such as repeated seven times along the measurement path of the rotor element 3.

In this embodiment the four-phase quadrature pattern is configured such that four consecutive drive coils forming the four-phase quadrature pattern is provided with a phase, of the multi-phase excitation signal, in the form of a 0° phase, a 90° phase, a 180° phase and a 270° phase respectively. This means that a drive coil SDC1 first in order of the four-phase quadrature pattern will be fed with an excitation signal having 0° phase, such as fed with the excitation signal E1 exemplified with reference to FIG. 2, a drive coil SDC2 second in order of the four-phase quadrature pattern will be fed with an excitation signal having 90° phase, such as fed with the excitation signal E3 exemplified with reference to FIG. 2, a drive coil SDC3 third in order of the four-phase quadrature pattern will be fed with an excitation signal having 180° phase, such as fed with the excitation signal E2 exemplified with reference to FIG. 2 and that a drive coil SDC4 fourth in order of the four-phase quadrature pattern will be fed with an excitation signal having 270° phase, such as fed with the excitation signal E4 exemplified with reference to FIG. 2. In case the rotary encoder 2 is configured for sensing rotary displacement of a shaft of an electric motor of the power tool then the number of four-phase quadrature patterns, i.e. periods, is preferably synchronized to the number of periods of the electric motor.

In a different embodiment the periodically repeating phase pattern P1 is provided as a three-phase pattern. The three-phase pattern is formed of three consecutive drive coils of the series of drive coils SDC1-SDCk. The three phase pattern is arranged to be repeated n times. A drive SDC1 first in order of the three consecutive drive coils forming the three-phase pattern is arranged to be fed with a with an excitation signal having 0° phase, such as fed with the excitation signal E1 exemplified with reference to FIG. 2, a drive coils SDC2 second in order of the three consecutive drive coils forming the three-phase pattern is arranged to be fed with a with an excitation signal having 120° phase and a drive coil SDC3 third in order of the three consecutive drive coils forming the three-phase pattern is arranged to be fed with a with an excitation signal having 240° phase.

It should be noted that any number of consecutive drive coils of the series of drive coils SDC1-SDCk may be arranged to form the periodically repeating phase pattern P1. It should also be noted that each drive coil comprised in periodically repeating phase pattern may be arranged to be fed with different excitation signals, i.e. excitation signals having different phases, than the excitations signals exemplified above depending on the application and the configuration of the signal generator circuit.

The stator element 4 according to an embodiment further comprises receiving means in the form of a balanced receiving coil SRC. The balanced receiving coil SRC is arranged to receive a signal, receive signal SR, corresponding to a signal transmitted from transmit means of the rotor element 3, said transmitted signal being the signal induced in the second conductive pattern CT2 of the rotor element 3 i.e. the intermediate signal SI as exemplified with reference to FIG. 1. The transmit means of the rotor element 3 will be explained in more detail with reference to FIG. 4. In more detail the balanced receive coil SRC of the stator element 4 comprises two balanced receive coil sections in the form of a first balanced receive coil section SRCA and a second balanced receive coil section SRCB. The first and second balanced receive coil sections are configured so that current induced in each of the first and second balanced receive coil sections flows in opposite direction in relation to each other. This means that currents induced in the first balanced receive coil section SRCA flows in opposite direction in relation to currents induced in the second balanced receive coil section SRCB. The first balanced receive coil section SRCA is configured to be arranged concentric around the centre of the stator element 4 at a third radial distance RD3. The second balanced receive coil section SRCB is configured to be arranged concentric around the centre of the stator element 4 at a fourth radial distance RD4. The first and second balanced receive coil section SRCA, SRCB are each formed of a spiral or serpentine winding having an annular shape.

The windings of the drive coils of the stator element 4 are preferably made of copper or other suitable material with conductive properties. The conductor width of the windings may be around 12 μm.

According to an embodiment the outer diameter of the stator element 4 is selected from a range of diameters including 10-500 mm, such as 40 mm.

It is to be noted that the stator element 4 exemplified with reference to FIG. 3 is similar to what is described with reference to FIG. 1 also preferable is a stator element 4 made of an electrically insulating substrate, such as made of a PCB.

Figure 4:
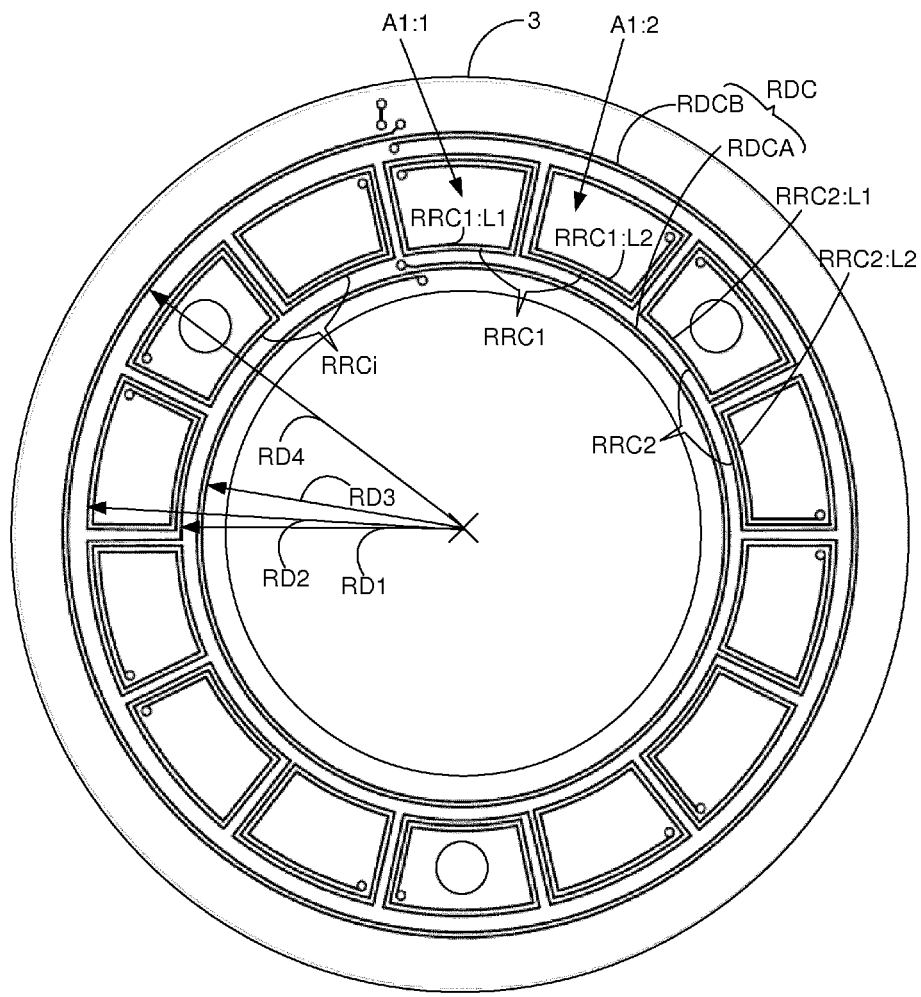
FIG. 4. shows schematically a plane view of a rotor of a rotary encoder according to an embodiment of the present invention.

With reference to FIG. 4 a rotor element of an inductive rotary encoder according to an embodiment of the present invention is illustrated.

The rotor element 3 of the inductive rotary encoder, such as the inductive rotary encoder 2, exemplified with reference to FIG. 1, comprises second conductive pattern, such as a first conductive pattern CT2, in the form of a series of receive coils RRC1, RRC2, . . . , RRCi, i.e. RRC1-RRCi. Thus, the series of receive coils RRC1-RRCi of the rotor element 3 comprises a number i of receive coils.

The series of receive coils RRC1-RRCi are arranged equidistant, i.e. the distance between receive drive coil and an adjacent receive coil of the series of receive coils is equal. The series of receive coils RRC1-RRCi are further arranged in the rotor element 3, such as arranged integrated in an annular disc shaped rotor element as exemplified with reference to FIG. 1, along a circumferential direction of the rotor element 3. This means that the series of receive coils RRC1-RRCi are arranged to form a measurement path, extending along the circumferential direction of the stator element 3.

Each receive coil of the series of receive coils RRC1-RRCi is further arranged in the rotor element at a predetermined first radial distance RD1 from the centre of the rotor element 3 and extending outwards to a second radial distance RD2 of the rotor element 3. Said first and second radial distance between which said receive coils extend corresponding to the first and second radial distance between which the drive coils of the stator element 4, such as the stator element exemplified with reference to FIG. 3, extend.

Each receive coil of the series of receive coils RRC1-RRCi is arranged with its main direction of extension aligned to the main direction of extension of the rotor element 3 i.e. arranged to extend in a plane formed of the main direction of extension of the rotor element 3. This means that the second conductive pattern CT2 or measurement path of the rotor element 3 is preferably configured to face the first conductive pattern CT1 or measurement path of the stator element 4.

Each receive coil of the series of receive coil RRC1-RRCi, such as the receive coil RRC1 of the rotor element 3 comprises a winding, having a spiral or serpentine winding, forming two separate, balanced, loop elements, referenced with index numbers L1, L2 in FIG. 3. The two loop elements of each receive coil RRC1-RRCi are intertwined by means of that the winding progresses between the two loop elements. This is for example shown in FIG. 3 where the receive coil RRC1 comprises two, balanced, intertwined loop element RRC1:L1, RRC1:L2 respectively and wherein the receive coil RRC2 comprises two, balanced, intertwined loop element RRC2:L1, RRC2:L2. Each of said two loop elements is further arranged in an inwardly/outwardly spiraling pattern in a similar fashion to the inwardly/outwardly spiraling pattern of the drive coils SDC1-SDCk of the stator element 4 exemplified with reference to FIG. 3, i.e. configured so as to comprise a pattern with curved and straight side sections respectively. The winding have two end points with associated terminals, each configured to be coupled to a terminal of an adjacent winding i.e. adjacent receive coil of the rotor element 3. Thus, the series of receive coils RRC1-RRCi of the rotor element 4 are configured to be connected in series.

The winding of each receive coil of the series of receive coils RRC1-RRCi has a predetermined number of turns. Preferably the predetermined number of turns in each winding is between 2-5 turns.

Each loop element of each receive coil of the series of receive coils RRC1-RRCi of the rotor element 3, such as the receive coil RRC1, surround an area A1:1, A1:2 each having a predetermined size both configured to be free of any form of conductive elements, such as windings. In more detail a first loop of each winding, i.e. receive coil of the rotor element 3, surround the area A1:1 and a second loop of each winding, i.e. receive coil of the rotor element 3, surround the area A1:2.

Each receive coil of the series of receive coils RRC1-RRCi of the rotor element 3 is further configured so that the extension in the plane formed of the main direction of extension of the rotor element 3 of the first and second loop elements of each receive coil of the series of receive coils RRC1-RRCi correspond to the extension of two adjacent drive coils of the series of drive coils SDC1-SDCk of the stator element 4. This means that each loop element, i.e. first and second loop elements of each of the receive coil of the series of receive coils RRC1 of the rotor element 3 spans an area corresponding to an area spanned by two adjacent drive coils including the area in between said two adjacent drive coils of the series of drive coils SDC1-SDCk of the stator element 4.

Furthermore, the distance along the measurement path of the rotor element 3 between each of the two loop elements of each receive coil of the series of receive coils RRC1-RRCi of the rotor element 3 and the distance along the measurement path of the rotor element 3 between each receive coil of the series of receive coils RRC1 corresponds to the distance along the measurement path of the stator element 4 between each drive coil of the series of drive coils SDC1-SDCk. This means that when the rotor element 3 moves along the measurement path of the rotor element 3 each loop element of each receive coil of the series of receive coils of the rotor element 3 will periodically face two adjacent drive coils of the series of drive coils SDC1-SDCk of the stator element 4.

The direction of the winding in the first loop element and the second loop element jointly forming each winding, i.e. receive coil of the rotor element 3, are configured so as to provide an alternating two-phase pattern which is repeated i−1 times along the measurement path of the rotor element 3, wherein i is an integer number ranging upwardly from one. This means that in case i equals one only the receive coil RRC1 forming the alternating two-phase pattern is present along the measurement path of the rotor element 3 and in case i equals 3 the receive coils RRC1, RRC2 and RRC3 are present along the measurement path of the rotor element 3, meaning that the repeating two-phase pattern is repeated two times in the form of RRC2 and RRC3 apart from the two-phase pattern formed by the receive coil RRC1. In more detail adjacent loop elements, i.e. the first and second loop of each of the receive coils of the series of receive coils RRC1-RRCi are configured to be in anti-phase i.e. they are 180° out of phase. This also means that adjacent loop elements in the form of a second loop element of receive coil and a first loop element of a consecutive, i.e. subsequent, receive coil of the series of receive coils RRC1-RRCi are in anti-phase. Further also adjacent loop elements in the form of a first loop element of receive coil and a second loop element of a previous receive coil of the series of receive coils are in anti-phase. By means of the alternating two-phase pattern the influence of electromagnetic interferences in the form of a common background alternating electromagnetic field since a current induced by means of the common background alternating electromagnetic field in adjacent loop elements will cancel out each other due to the adjacent loop elements being in anti-phase. This will not be the case for currents induced by means of providing the excitation signal to the first conductive pattern since each loop elements of the receive coils by means of the configuration of the excitation signal and the first conductive pattern of the stator element will be induced by currents with different phase.

The rotor element 3 according to an embodiment further comprises transmitting means in the form of a balanced drive coil RDC. According to this embodiment the stator element 4 is configured with receiving means in the form of a balanced receive coil as explained in more detail with reference to FIG. 3. The balanced drive coil RDC of the rotor element 3 is configured to be coupled to the second conductive pattern CT2 of the rotor element 3 so that when the intermediate signal SI is generated in the second conductive pattern of the rotor element 3 due to energisation of the first conductive pattern CT1 of the stator element 4 this intermediate signal will also propagate into the balanced drive coil of the rotor element 3, resulting in that a signal, receive signal SR, is generated in the balanced receive coil SRC of the stator element 4.

In more detail the balanced drive coil RDC of the rotor element 3 comprises two balanced drive coil sections in the form of a first balanced drive coil section RDCA and a second balanced drive coil section RDCB. The first and second balanced drive coil sections are configured so that current induced in each of the first and second balanced drive coil sections flows in opposite direction in relation to each other. This means that currents induced in the first balanced drive coil section RDCA flows in opposite direction in relation to currents induced in the second balanced drive coil section RDCB. The first balanced drive coil section RDCA is configured to be arranged concentric around the centre of the rotor element 3 at a third radial distance RD3 i.e. at the same radial distance as the first balanced receive coil section SRCA of the stator element 4 such as the stator element exemplified with reference to FIG. 3. The second balanced drive coil section RDCB is configured to be arranged concentric around the centre of the rotor element 3 at a fourth radial distance RD4 i.e. at the same radial distance as the second balanced receive coil section SRCB of the stator element 4. This means that the first balanced drive coil section RDCA of the rotor element 3 is arranged so as to face the first balanced receive coil section SRCA of the stator element 4 and that the second balanced drive coil section RDCB of the rotor element 3 is arranged so as to face the second balanced receive coil section SRCB of the stator element 4 whereby mutual inductance occurs upon energisation of the balanced drive coil RDC of the rotor element 3. This further means that when the balanced drive coil RDC, and thereby also its balanced drive coil sections RDCA, RDCB, of the rotor element 3 are energised by said intermediate signal SI this intermediate signal SI will be transmitted to the balanced receive coil sections SRCA, SRCB of the stator element 4 due to the mutual inductive coupling between the balanced drive coil sections RDCA, RDCB of the rotor element 3 and the balanced receive coil sections SRCA, SRCB of the stator element 4. This results in that a signal, receive signal SR, is generated in the balanced receive coil SRC of the stator element 4, wherein the receive signal SR corresponds to the intermediate signal SI being transmitted and received via the balanced drive coil RDC of the rotor element 3 and the balanced receive coil SRC of the stator element 4 respectively.

According to an embodiment the rotor element 3 comprises a LC band pass filter formed by the series of receive coils RRC1-RRCi, the balanced drive coil RDC with balanced drive coil sections RDCA, RDCB and at least one capacitor component (not shown). Said LC band pass filter is configured to have a center frequency being substantially equal to the frequency of said high-frequency excitation signals E1-E4. Said at least one capacitor component is arranged so as to provide attenuation of out of band noise that is filtered out by the filter property of said LC band pass filter.

According to an embodiment the rotor element 3 comprises at least one capacitance layer (not shown), that is embedded in the rotor element 3 using Embedded Capacitance Material (ECM). The at least one capacitance layer together with the series of receive coils RRC1-RRCi and the balanced drive coil RDC forming the above mentioned LC band pass filter. Because the filtering capacitor functionality is embedded in the rotor element 3, in the form of the at least one capacitance layer, the risk of mechanical damage due to stress or handling is largely reduced.

According to an embodiment the outer diameter of the rotor element 3 is selected from a range of diameters including 10-500 mm, such as 40 mm.

It is to be noted that the rotor element exemplified with reference to FIG. 3, similar to what is described with reference to FIG. 1, preferably is a rotor element 3 made of an electrically insulating substrate, such as made of a PCB.

Figure 5A:
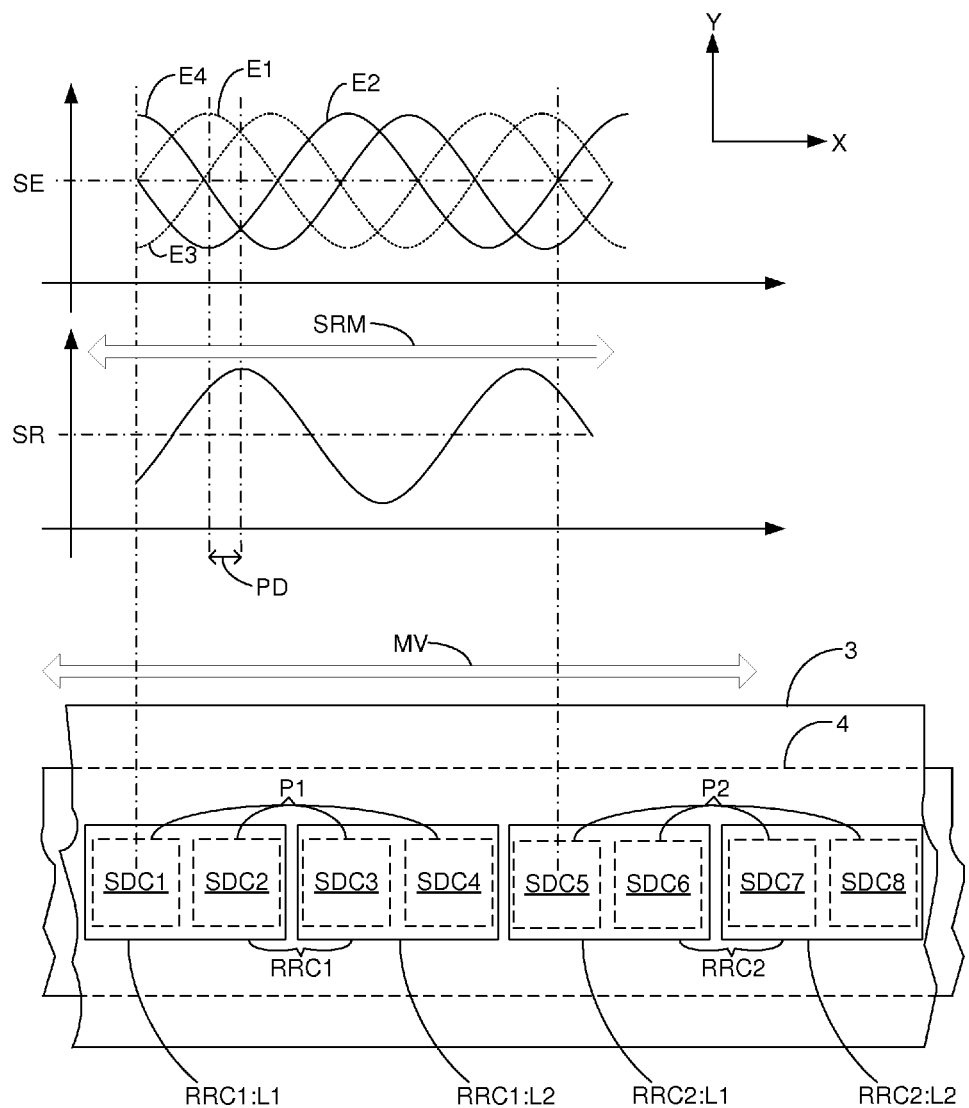
FIG. 5A. shows schematically waveforms outputted at a rotor of a rotary encoder according to an embodiment of the present invention.

With reference to FIG. 5A waveforms generated in a conductive pattern of a rotor element upon relative movement between a stator element and a rotor element according to an embodiment of the present invention is illustrated.

For purpose of illustration FIG. 5A shows a linear configuration of a stationary stator element 4, having a first conductive pattern in the form of a series of drive coils SDC1-SDCk, together with a linear configuration of a relatively moveable rotor element 3, having a second conductive pattern in the form of a series of receive coils RRC1-RRCi being superimposed thereon. The rotor element 3 is moveable relative to the stator element 4 back and forth in direction MV. Thus, FIG. 5A shows a linear inductive encoder with waveforms outputted from the linear inductive encoder upon linear movement of the moveable rotor element which moves relative to the stationary stator element. However, with respect to outputting waveforms upon relative movement of the rotor element the same principles apply for both linear and rotary encoders.

For purpose of illustration only a portion of the rotor element and the stator element is illustrated in FIG. 5A. The portion of the rotor element being illustrated in FIG. 5A includes two consecutive receive coils RRC1-RRC2 of the series of receive coils of the rotor element 3, wherein each of the two receive coils RRC1-RRC2 comprises a first and second loop intertwined loop RRC1:L1, RRC1:L2 and RRC2:L1, RRC2:L2 respectively, as exemplified with reference to for example FIG. 4. The portion of the stator element being illustrated in FIG. 5A includes eight consecutive drive coils SDC1-SDC8 of the series of receive coils SDC1-SDCk of the stator element 4.

The excitation signal SE, shown in FIG. 5A, provided from the signal generator circuit 6 exemplified in more detail with reference to FIG. 2, is in the illustrated example with reference to FIG. 5A configured as a multi-phase high-frequency excitation signal SE having four high-frequency excitation signals, each with substantially constant amplitude and a phase of number of predetermined phases. In more detail the multi-phase high-frequency signal SE includes a high-frequency excitation signal E1 having a 0° phase, a high-frequency excitation signal E3 having a 90° phase, a high-frequency excitation signal E2 having a 180° phase and a high-frequency excitation signal E4 having a 270° phase.

In the shown example with reference to FIG. 5A, the series of drive coils of the stator element is arranged in a periodically repeating phase pattern P1, comprising four consecutive drive coils. This means that the first, second, third and fourth drive coil in consecutive order SDC1-SDC4 forms the repeating phase pattern P1 which is repeated in a first repetition P2 in the form of the drive coils SDC5-SDC8.

The excitation signals E1-E4 of the multi-phase excitation signal SE is in the example with reference to FIG. 5A arranged to be provided to the drive coils of the stator element so that a first drive coil SDC1, SDC5 first in consecutive order of each repetition P1-P2 of the repeating phase pattern P1 is fed with the excitation signal E1, a second drive coil SDC2, SDC6 second in consecutive order of each repetition P1-P2 of the repeating phase pattern P1 is fed with the excitation signal E3, a third drive coil SDC3, SDC7 third in consecutive order of each repetition P1-P2 of the repeating phase pattern P1 is fed with the excitation signal E2, and a fourth drive coil SDC4, SDC8 fourth in consecutive order of each repetition P1-P2 of the repeating phase pattern P1 is fed with the excitation signal E4.

In the illustrated example with reference to FIG. 5A the rotor element is positioned relative to the stator element such that the first and second loop RRC1:L1, RRC1:L2, RRC2:L1, RRC2:L2 of each of the shown receive coils RRC1, RRC2 faces two consecutive drive coils of the stator element. In more detail the first loop RRC1:L1 of the first receive coil RRC1 faces a first and second consecutive drive coil SDC1, SDC2 respectively, the second loop RRC1:L2 of the first receive coil RRC1 faces a third and fourth consecutive drive coil SDC3, SDC4 respectively, the first loop RRC2:L1 of the second receive coil RRC2 faces a fifth and sixth consecutive drive coil SDC5, SDC6 respectively, and the second loop RRC2:L2 of the second receive coil RRC2 faces a seventh and eighth consecutive drive coil SDC7, SDC8 respectively. The first and second receive coils are positioned overlapping the respective drive coils so that the first and second loop elements with index numbers L1 and L2 of each receive coil RRC1, RRC2, illustrated with reference to FIG. 4, faces two consecutive drive coils i.e. each receive coil is positioned centred on top of four consecutive drive coils.

As the excitation signal SE is provided to the series of drive coils of the stator element as explained above currents will due to mutual induction between the drive coils of the stator element and receive coils of the rotor element be induced in the receive coils of the rotor element resulting in that an intermediate signal SI is formed in the receive coils of the rotor element 3. This intermediate signal will later be transmitted by the balanced drive coil of the rotor element to the balanced receive coil of the stator element as explained in more detail with reference to for example FIG. 4. This results in that the receive signal SR corresponding to the intermediate signal SI is generated in the stator element i.e. in the balanced receive coil of the stator element. Due to the earlier described configuration of the stator and the rotor element and the multi-phase excitation signal the intermediate signal and thereby also the receive signal SR will have a phase corresponding to a sum of the phases of the multi-phase excitation signal. Said phase of the receive signal SR will as the rotor element moves relative to the stator element be phase shifted, i.e. the phase of the receive signal moves along a direction SRM back and/or forth relative to each of the high-frequency excitation signals of the multi-phase high-frequency excitation signal SE based on the relative position between the rotor and stator element.

Thus, the phase of the receive signal SR relative to the phase of one, such as anyone, of the high-frequency excitation signals of the multi-phase excitation signal will indicate the relative displacement between the rotor and the stator element in terms of angular displacement expressed in electrical degrees. The angular displacement expressed in electrical degrees can be translated into mechanical degrees by means of using information at least about the number of periodically repeating phase pattern arranged along the measurement path of the stator element. Each repetition of the periodically repeating phase pattern form an electrical period. Thus, the electrical period translate into fraction of a full mechanical revolution of the rotor element relative to the stator element wherein said fraction is determined by the number of electrical periods i.e. the number of periodic repetitions of the periodically repeating phase pattern.

In the illustrated example with further reference to FIG. 5A the rotor element is positioned relative to the stator element such that receive signal SR have 45° phase shift, i.e. phase difference PD equals 45°, relative to the high-frequency excitation E1 of the multi-phase high frequency excitation signal SE. This means that the rotor element is positioned relative to the stator element so that the center of the first loop RRC1:L1 of the receive coil RRC1 of the rotor element is positioned 45° relative to the center of the drive coil SDC1, i.e. as exemplified in FIG. 5A the center of the first loop is positioned between the drive coil SDC1 and the drive coil SDC2. This also means that the rotor element is positioned displaced 45 electrical degrees as compared to a relative position between the rotor element and the stator element when the center of the first loop RRC1:L1 is aligned with the center of the drive coil SDC1, i.e. the first loop RRC1:L1 being centered on top of SDC1, for which relative position the receive signal SR is in phase with the excitation signal E1, i.e. the phase difference PD between E1 and SR equals zero degrees. In order to determine if the rotor has moved or if it is in a stationary or temporary stationary position relative to the stator element, previously detected phase differences can be used. As an example in case the previous phase difference was 0 electrical degrees and that the current phase difference is 45 electrical degrees then it can be concluded that the rotor element has moved 45 electrical degrees relative to the stator element. In order to detect forward or backward motion of the rotor element relative to the stator element increase or decrease in phase shift with regard to previously determined phase shifts is used.

For example if the stator element comprises six repetitions of the periodically repeating phase pattern P1, i.e. the repeating phase pattern P1 appears seven times along the measurement path of the stator element including P1 itself, a progression of the phase difference from 0° to 360°, i.e. from 0° to 0°, will correspond to a relative angular displacement of 360° in electrical degrees which corresponds to a relative angular displacement of a fraction being a seventh of a full mechanical revolution of the rotor element relative to the stator element.

Figure 5B:
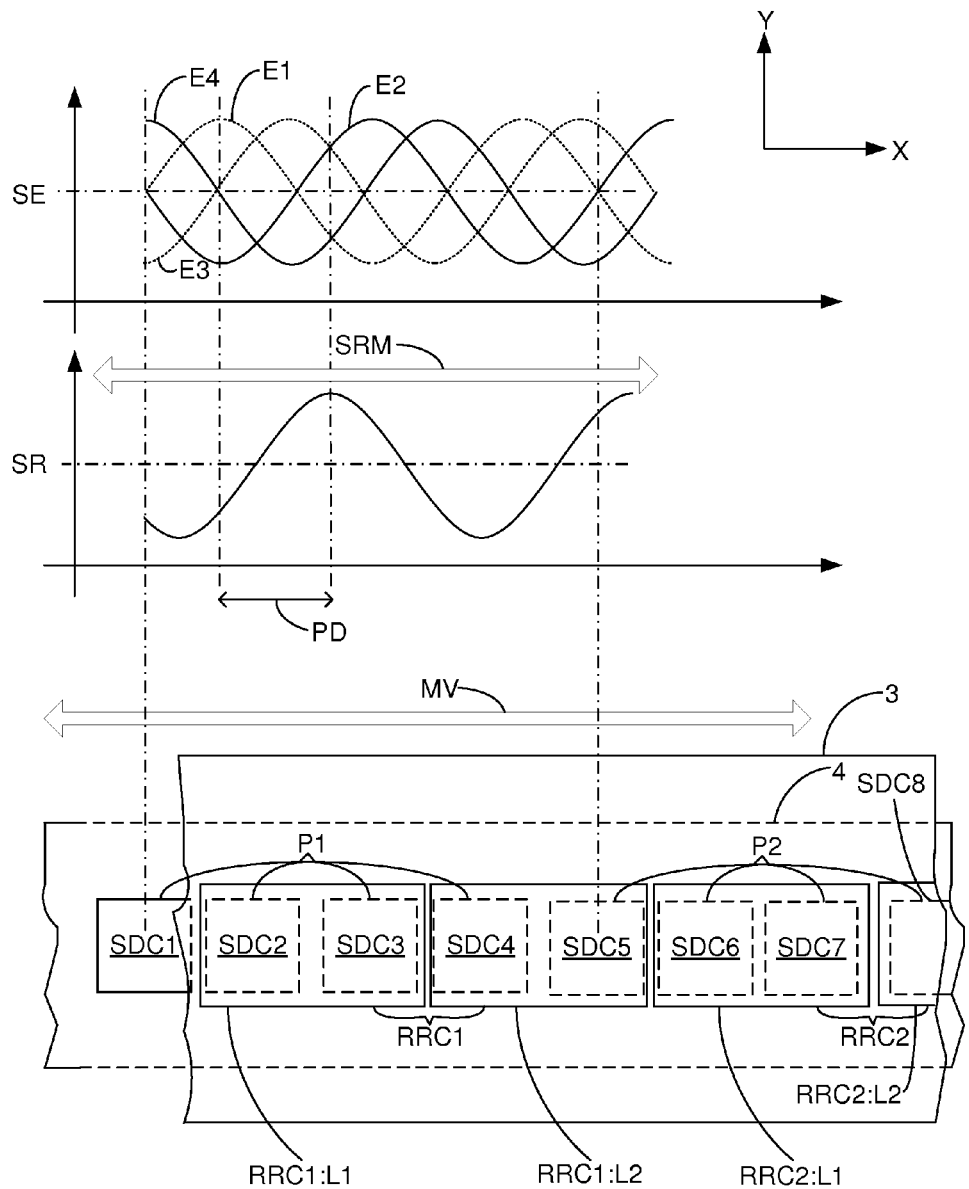
FIG. 5B. shows schematically waveforms outputted at a rotor of a rotary encoder according to an embodiment of the present invention.

The above described resulting wave forms with regard to the receive signal SR resulting from energisation using the multi-phase high-frequency excitation signal SE dependent on the relative position of the rotor element and the stator element is also illustrated in FIG. 5B which for purpose of illustration in similar a fashion to what is described with reference to FIG. 5A also show a linear configuration of a stationary stator element 4 and a relatively moving moveable rotor element 3 in which the stator, rotor element and the excitation signal is configured in a similar fashion to what is described with reference to FIG. 5A. However, in FIG. 5B the rotor element has moved 135° electrical degrees relative to the stator element. This can be seen by means of that the receive signal SR is phase shifted 135°, i.e. have a phase difference PD which equals 135°, relative to the phase of the high-frequency excitation signal E1 of the multi-phase high-frequency signal SE. In more detail the rotor element 3 shown in FIG. 5B has moved relative to the stator element 4 such that the first loop RRC1:L1 of the first receive coil RRC1 faces a second and third consecutive drive coil SDC2, SDC3 respectively, the second loop RRC1:L2 of the first receive coil RRC1 faces a fourth and fifth consecutive drive coil SDC4, SDC5 respectively, the first loop RRC2:L1 of the second receive coil RRC2 faces a sixth and seventh consecutive drive coil SDC6, SDC7 respectively, and the second loop RRC2:L2 of the second receive coil RRC2 faces an eighth SDCB and ninth (not shown) consecutive drive coil respectively.

It should be noted that the rotor and/or stator element may be configured differently than the illustrated examples with reference to FIG. 5A and FIG. 5B. For example the number of drive coils comprised in the repeating phase pattern may comprise more or fewer drive coils. Each of the drive coils may also be provided with different excitation signals. As an example the repeating phase pattern may comprise three consecutive drive coils which are fed with a 0° phase, a 120° phase and a 240° phase in consecutive order of the drive coils or the repeating phase pattern. Also another signal than the signal E1 may be used as reference signal e.g. anyone of the signals E1-E4 may be used. Further variations may for example include one or more features as described in conjunction with one or more of the different embodiments described above with reference to FIG. 1 through FIG. 4.

Furthermore, it should be noted that the illustrated examples with reference to FIGS. 5A and 5B only show a portion of the rotor element and stator element in a linear layout respectively. Accordingly, the rotor element and stator element may be configured in an annular fashion so as to provide a rotary displacement sensor. Also, the rotor element may comprise more receive coils than shown in FIGS. 5A and 5B and the stator element may comprise more drive coils than shown in FIGS. 5A and 5B. Also depending on the configuration of the stator element and rotor element for example with respect to the number of drive coils/receive coils and the number of drive coils included in the repeating phase pattern P1 the number of electrical periods per mechanical revolution of the rotor element relative to the stator element may be different, for example if the repeating phase pattern is repeated zero times, i.e. only the phase pattern P1 itself appears along the measurement path of the stator element with no repetitions P2, P3 etc., then the corresponding number of electrical periods per mechanical revolution of the rotor element relative to the stator element will be one.

Figure 6:
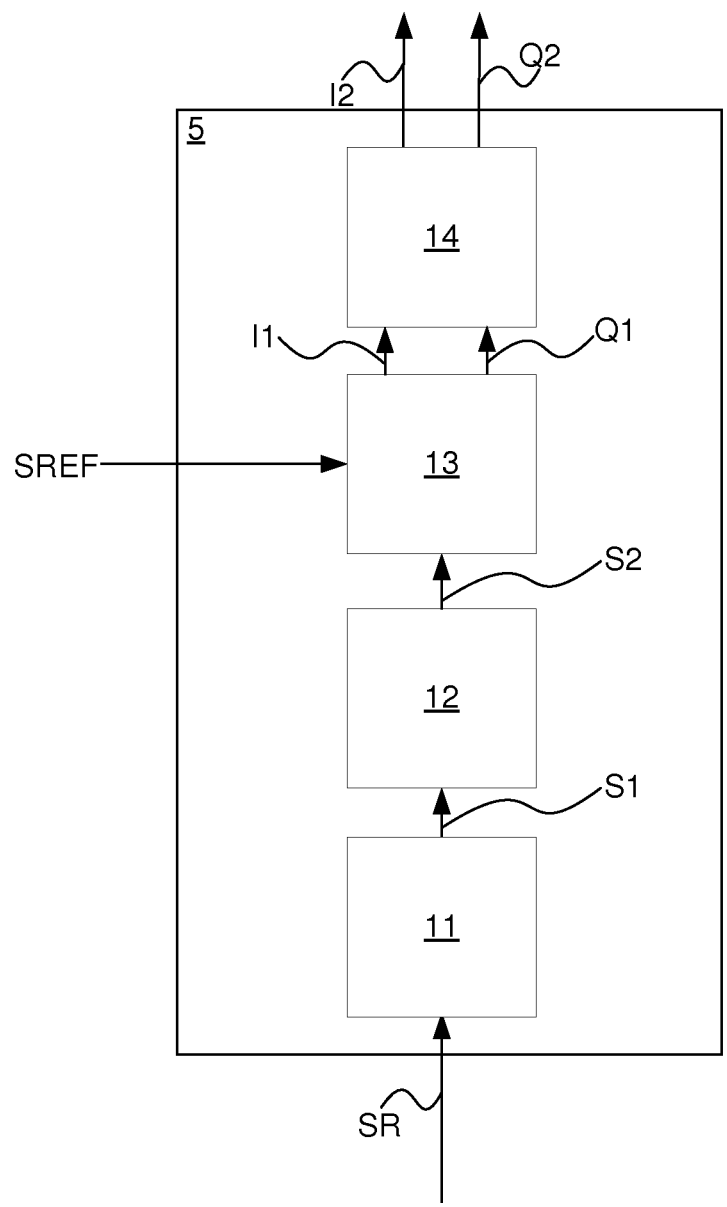
FIG. 6. shows schematically a block diagram of signal processor circuit according to an embodiment of the present invention.

With reference to FIG. 6 a signal processor circuit for an inductive rotary encoder according to an embodiment of the present invention is illustrated.

The signal processor circuit 5 is configured to be coupled to a stator element, such as coupled to the stator element 4 exemplified with reference to any of FIG. 1 or FIG. 3. In more detail the signal processor circuit 5 is configured to be coupled to the stator element via at least one main terminal such as the at least one main terminal M1 exemplified with reference to FIG. 3.

The signal processor circuit 6 is configured to receive the receive signal SR, corresponding to the intermediate signal SI being induced the second conductive pattern CT2 of the rotor element upon excitation of the first conductive pattern of the rotor element 3. In more detail the receive signal SR corresponds to the intermediate signal SI having been transmitted from the rotor element and received by the stator element as described in more detail with reference to FIG. 3 and FIG. 4.

The signal processor circuit 6 is further configured to receive a reference signal SREF, corresponding to the excitation signal SE or in more detail one of excitation signal E1-E4 of the multi-phase excitation signal SE. It should be understood that anyone of the excitation signals E1-E4 of the multi-phase excitation signal could be used as reference signal SREF.

The signal processor 5 comprises a differential pre-amplifier circuit 11 arranged to amplify the receive signal SR so as to provide an amplified signal S1 based on the receive signal SR. The pre-amplifier circuit is further arranged to be coupled to a band pass filter circuit 12 comprised in the signal process circuit and to send said amplified signal S1, being the amplified version of the receive signal SR. to the band pass filter circuit 12.

The band pass filter circuit is configured to have a center frequency substantially equal to the frequency of the excitation signal SE generated by the signal generator circuit 6. This means that frequency components near the band pass filter circuit center frequency will pass through to an output of the band pass filter circuit and that remaining frequency components will be attenuated i.e. substantially filtered out. Thus, mainly frequency components of the amplified signal S1 received by the band pass filter circuit that have a frequency around about the frequency of the excitation signal SE will be outputted by the band pass filter circuit while remaining frequency components will be heavily attenuated.

The band pass filter circuit 12 is further configured to be coupled to a phase detector circuit 13 so as to provide a filtered signal S2 being the resulting signal from the above mentioned band pass filtering process performed by the band pass filter 12 on the amplified signal S1.

The phase detector circuit 13 is configured to receive the above mentioned filtered signal S2 and the reference signal SREF.

The phase detector circuit is configured as a demodulator or decoder. The phase detector circuit 13 is configured to operate using a reference signal with a known frequency and phase relationship corresponding to the excitation signal SE. In more detail the phase detector circuit is configured to detect and output the phase difference between the reference signal SREF and the filtered signal S2, wherein said phase difference configured to be detected and outputted by the phase detector circuit is indicative of the relative displacement between the stator element 4 and the rotor element 3.

Preferably the phase detector circuit 13 comprises an in-phase/quadrature (I/Q) demodulator or I/Q decoder circuit configured to, based on the received reference signal SREF and filtered signal S2, generate and output information, such as generate and output information SOUT illustrated with reference to FIG. 1, in the form of two quadrature signals, I1 and Q1 respectively, which are indicative of phase difference of said received signal SR and said excitation signal SE. Preferably the I/Q demodulator further comprises at least one low pass filter providing low pass filtering so as to suppress signal variations of the I1 and Q1 signals respectively. The low pass filtering accuracy of the displacement sensing by filtering out the high-frequency excitation signal.

The I/Q demodulator circuit may for example comprise two demodulators, one of which generates the in-phase signal I1 and one of which generates the quadrature-phase signal Q1. The demodulator configured to generate the in-phase I1 signal may be operated using 0° phase and the demodulator configured to generate the quadrature-phase signal Q1 may be operated using 90° phase.

The signal processor circuit 5 may further comprise an analogue-to-digital converter (ADC) 14. The ADC 14 is configured to be coupled to the phase detector circuit 13 so as to receive the signals outputted there from and provide analogue-to-digital conversion of the signal received from the phase detector circuit 13. The ADC 14 may be configured as a 12-bit ADC or configured depending on the application to operate using a different bit resolution. Thus, the ADC 14 is configured to output digitalized versions 12, Q2 of the signals I1, Q1 received at is inputs.

It should be understood that the above described signal processor circuit may be configured differently than the described signal processor with reference to FIG. 6. For example the signal processor circuit may comprise more or fewer components, such as filters and amplifiers.

In order to unambiguously determine a resulting relative displacement D between the rotor element 3 and the stator element 4 an inverse tangent function, i.e. "arctan" function, can be used, given by expression (1):

$$\text{if } \left( (\text{abs}(I1) > \text{abs}(Q1)) \right) \qquad (1)$$
$$D = \left( \frac{\pi}{2} - \text{sgn}(I1) * \left( \frac{\pi}{2} \right) \right) + \text{atan}\left( \frac{Q1}{I1} \right)$$
$$\text{elseif}(\text{abs}(I1) \not> \text{abs}(Q1))$$
$$D = \left( \pi - \text{sgn}(Q1) * \left( \frac{\pi}{2} \right) \right) - \text{atan}\left( \frac{I1}{Q1} \right)$$

In the expression (1) the term I1 is the in-phase signal I1 and the term Q1 is the quadrature-phase signal Q1 outputted by the phase detector circuit 13. In more detail with regard to expression (1) the relative displacement D is derived differently based on if the absolute value of the I1 signal is determined to be larger than the absolute value of the signal Q1. The conditional if statements, related to how the relative displacement D is derived, are comprised in the expression (1) to enable deriving a single value of D independently of the actual value of the terms of expression (1) since the arctan function only provides a single value for parameters within the range of 0° to 90°. The in-phase and quadrature signals I1, Q1 respectively can be expressed by expressions 2 and 3 below:

$$I1 = SR * sgn(\sin(2\pi * f_c * t)) \qquad (2)$$

$$Q1 = SR * sgn(-\cos(2\pi * f_c * t)) \qquad (3)$$

The term $f_c$ in expressions (2) and (3) denotes a signal which is in phase with the signal used as SREF, such as for example E1, and which has the same frequency as SREF. In expressions (2) and (3), which relates to the in-phase and quadrature signals I1, Q1 respectively, the term SR denotes the receive signal SR which is explained in more detail above with reference to for example any of FIGS. 1, 5A, 5B and 6. Accordingly, the receive signal SR is corresponding to the generated intermediate signal SI which is generated as a phase sum of the excitation signals induced in the second conductive pattern CT2 of the rotor element 3 upon being provided to the first conductive pattern CT1 of the stator element. The term t in expressions (2) and (3) denotes time. In case the above described four-phase pattern is implemented which as described above is energized by excitation signals of the multi-phase excitation signal comprising four excitation signals, one with 0° phase, one with 90° phase, one with 180° and one with 270°, the receive signal SR is given by expression (4):

$$SR = f(AD \cdot \varphi) * E1 + f(AD \cdot \varphi - \pi/2) * E3 + f(AD \cdot \varphi - \pi) * E2 + f(AD \cdot \varphi - 3\pi/2) * E4 \qquad (4)$$

In expression (4) the term AD denotes the distance between stator element 4 and the rotor element 3, also referred to as the axial distance AD as exemplified with reference to FIG. 1. The term g in expression (4) denotes the angular displacement between the stator element and the rotor element within an electrical period i.e. the angular displacement between the stator element and the rotor element within a period of the above described periodically repeating phase pattern P1. In the exemplified stator and rotor element with reference to FIG. 3 and FIG. 4 there is seven electrical periods for each full mechanical revolution of the rotor element relative to the stator element i.e. the periodically repeating phase pattern is repeated seven times.

Accordingly, the receive signal SR is dependent, i.e. is a function f, dependent on the configuration of the multi-phase excitation signal, the distance between the rotor and stator element AD and the above mentioned angular difference $\varphi$ between the stator element and the rotor element.

It should be noted that several of the terms of expressions (1) through (4) are time dependent, i.e. dependent on time t. As an example the terms E1-E4, $\varphi$, Q1 and I1 are dependent on time t. It should be noted that the term $\varphi$ only varies over time t in case the rotor element is moving, i.e. not during when the rotor element is in a static position, such as in a temporary static position.

With reference to FIG. 7A an illustration of a flow diagram of a method for performing sensing of displacement between two relatively moveable parts of a power tool, using an inductive rotary encoder, according to an embodiment of the present invention is provided.

In a first method step S100 a high-frequency excitation signal is generated. Preferably high-frequency excitation AC signals having substantially constant amplitude is generated by a signal generator circuit coupled to the stator element. Preferably the high-frequency signal generated by the signal generator circuit is a multi-phase high-frequency excitation signal, comprising a plurality of phases i.e. the multi-phase high-frequency signal comprises a plurality of high-frequency excitation signals each having a phase of a plurality of phases, such as a phase of a plurality of predetermined phases. The signal generator circuit is further preferably configured as explained with reference to FIG. 2. After the method step S100 a subsequent method step S110 is performed.

In the method step S110 the high-frequency AC signal is provided to a first conductive pattern of a stator element. The high-frequency AC signals provided to the first conductive patterns of a stator element are further configured to have substantially constant amplitude. In more detail signal generator, such as the signal generator 6 exemplified with reference to FIG. 2, responsible for generating the high-frequency AC excitation signal is configured to be coupled to peripheral terminals of the stator element, wherein said terminals are configured to be coupled to the first conductive pattern CT1, such as coupled to the first conductive pattern exemplified with reference to any of FIG. 1 or FIG. 3. This means that the signal generator 6 is able to provide said high-frequency AC excitation signal to the first conductive pattern of the stator element. After the method step S110 a subsequent method step S120 is performed.

In the method step S120 an intermediate signal is generated in a second conductive pattern CT2 of a rotor element. In more detail the intermediate signal, such as the intermediate signal SI exemplified with reference to FIG. 1, is generated in the second conductive pattern of the rotor element, such as the rotor element 3 exemplified with reference to any of FIG. 1 and FIG. 3, due to mutual induction occurring between the first conductive pattern of the stator element and the second conductive pattern of the rotor element. Said intermediate signal SI is indicative of the relative displacement between the rotor element and the stator element. After the method step S120 the method ends.

FIG. 7B illustrates a more detailed embodiment of the method for performing sensing of displacement between two relatively moveable parts of a power tool, using an inductive rotary encoder.

The method according to this embodiment comprises three method steps S200, S210 and S220 to be performed in succession. Said method steps S200, S210 and S220 corresponding to the method steps S100, S110 and S120 respectively of the method illustrated with reference to FIG. 7A.

With continued reference to the method of FIG. 7B after the method step S220 a subsequent method step S230 is performed. In the method step S230 the intermediate signal SI is transmitted from the rotor element 3. In more detail the intermediate signal is transmitted from the rotor 3 element using a balanced drive coil RDC, such as exemplified with reference to FIG. 4. The balanced drive coil RDC of the rotor element 3 is configured for coupling to the second conductive pattern of the rotor element 3. This means that the balanced drive coil RDC of the rotor element 3 is configured such that when a current is induced in the second conductive pattern CT2 of the rotor element 3 following provision of said excitation signal the resulting intermediate signal SI of the second conductive pattern CT2 will be provided in the balanced drive coil RDC of the rotor element 3. The rotor element 3 preferably comprises a LC band pass filter formed by series of receive coils RRC1-RRCi, the balanced drive coil RDC and at least one capacitor. Said LC band pass filter centre frequency is set to a frequency substantially equal to the frequency of said multi-phase high-frequency excitation signal that is provided to first conductive patterns of a stator element. After the method step S230 a subsequent method step S240 is performed.

In the method step S240 a receive signal SR corresponding to the intermediate signal is received at the stator element. In more detail the intermediate signal SI transmitted from the balanced drive coil RDC of the rotor element 3 is picked up, causing the receive signal SR to be generated, at the stator element 4 by means of a balanced receive coil SRC, such as exemplified with reference to FIG. 3. The intermediate signal SI provided to the balanced drive coil RDC of the rotor element 3 will due to mutual induction propagate into the balanced receive coil SRC of the stator element 4 thereby causing said receive signal SR to be generated at the stator element. After the method step S240 a subsequent method step S250 is performed.

In the method step S250 the receive signal SR is processed. In more detail the receive signal is received at a signal processor circuit, such as at a signal processor circuit 6 exemplified with reference to FIG. 6. The signal processor circuit 6 is configured to process the receive signal SR so as to determine the phase difference between the receive signal SR and a reference signal SREF, wherein said phase difference being indicative of the relative displacement between the rotor element and the stator element. The reference signal comprises the high-frequency excitation signal SE or more suitably one excitation signal E1-E4 of the high-frequency excitation signal SE when being configured as a multi-phase high-frequency excitation signal SE. The signal processor circuit may be arranged to process the receive signal, based on the using the reference signal SREF as reference, by means of quadrature demodulation of the received signal so as to determine the relative displacement between the rotor element 3 and the stator element 4. This is explained in more detail with reference to FIG. 6. After the method step S250 the method may end or be repeated from method step S200.

According to a preferred embodiment the method step S200 comprises generating a multi-phase high-frequency excitation signal, such as a periodic multi-phase high-frequency excitation signal having a plurality of phases, i.e. the multi-phase excitation signal comprises a plurality of high-frequency excitation signals E1-E4, each having a phase of a plurality of phases, such as exemplified with reference to FIG. 2. According to this embodiment the method step S210 comprises providing drive coils forming a periodically repeating phase pattern P1 which is repeated n times along the measurement path so that drive coils of the periodically repeating phase pattern each is fed with a phase of the plurality of phases of the multi-phase high-frequency excitation signal. This is explained in more detail with reference to FIG. 3.

As an example the above described multi-phase excitation signal generated in step S200 may be generated so as to comprise four high frequency excitation signals each having a different phase. In this example the series of drive coils of the stator element is configured to form a periodically repeating phase pattern comprising four consecutive drive coils of which a first drive coil being first in order of the four consecutive drive coils is arranged to be fed with an excitation signal of the multi-phase high-frequency excitation signal having 0° phase, a second drive coil being second in order of the four consecutive drive coils is arranged to be fed with an excitation signal having 90° phase, i.e. phase shifted 90° relative to the excitation signal fed to the first drive coil, a third drive coil being third in order of the four consecutive drive coils is arranged to be fed with an excitation signal having 180° phase and a fourth drive coil being fourth in order of the four consecutive drive coils is arranged to be fed with an excitation signal having 270° phase. This phase pattern is arranged to be repeated along the measurement path of the stator element so that the phase pattern is repeated n times so as to form n repetitions P1-Pn of the above described phase pattern.

As another example the above described multi-phase excitation signal generated in step S200 may be generated so as to comprise three high frequency excitation signals each having a phase. In this example the series of drive coils of the stator element is configured to form a periodically repeating phase pattern comprising three consecutive drive coils of which a first drive coil being first in order of the three consecutive drive coils is arranged to be fed with an excitation signal of the multi-phase high-frequency excitation having 0° phase, a second drive coil being second in order of the three consecutive drive coils is arranged to be fed with an excitation signal having 120° phase, i.e. phase shifted 120° relative to the excitation signal fed to the first drive coil and a third drive coil being third in order of the three consecutive drive coils is arranged to be fed with an excitation signal having 240° phase. This phase pattern is arranged to be repeated along the measurement path of the stator element so that the phase pattern is repeated n times so as to form n repetitions P1-Pn of the above described phase pattern.

Many modifications and variations will be apparent to practitioners skilled in the art without departing from the scope of the invention as defined in the appended claims. The examples were chosen and described in order to best explain the principles of the invention and its practical applications, thereby enabling others skilled in the art to understand the invention for various examples and with various modifications as suited to the particular use contemplated.

The invention claimed is:

1. A displacement sensor for a power tool, the displacement sensor comprising:
    a stator element and a rotor element configured for relative movement along a measurement path, said stator element having a first conductive pattern and said rotor element having a second conductive pattern, the first conductive pattern and the second conductive pattern being mutually inductively coupled, the first conductive pattern being configured to receive an excitation signal, the second conductive pattern being configured to generate an intermediate signal therein caused due to mutual induction between the first conductive pattern and the second conductive pattern, said intermediate signal being indicative of the relative displacement between the stator element and the rotor element, and the excitation signal being a high-frequency excitation signal having substantially constant amplitude, and
    a single phase signal processor circuit configured to receive and process a single phase receive signal, corresponding to the intermediate signal received at the stator element, so as to provide an output signal indicative of the relative displacement between the rotor element and the stator element, the single phase signal processor circuit comprising a phase detector circuit configured to process the single phase receive signal in order to detect a phase difference between the single phase receive signal and a reference signal corresponding to the excitation signal so as to provide said output signal.

2. The displacement sensor according to claim 1, wherein the excitation signal is a signal having a frequency selected from a frequency range of 100 KHz-100 MHz.

3. The displacement sensor according to claim 1, wherein the excitation signal is a signal having a frequency selected from a frequency range of 1 MHz-10 MHz.

4. The displacement sensor according to claim 1, wherein the excitation signal is configured to be a multi-phase excitation signal comprising a plurality of high-frequency excitation signals each having a phase of a plurality of phases.

5. The displacement sensor according to claim 4, wherein the multi-phase excitation signal is a four-phase excitation signal having four phases comprising a 0 degree phase, a 90 degree phase, a 180 degree phase and a 270 degree phase.

6. The displacement sensor according to claim 4, wherein the multi-phase excitation signal is a three-phase excitation signal having three phases comprising a 0 degree phase, a 120 degree phase and a 240 degree phase.

7. The displacement sensor according to claim 4, wherein the first conductive pattern of the stator element comprises a series of drive coils extending along a measurement path of the stator element, the series of drive coils being arranged in a periodically repeating phase pattern which is repeated n times along the measurement path of the stator element, and each drive coil of the periodically repeating phase pattern being configured to be fed with a phase of the multi-phase excitation signal.

8. The displacement sensor according to claim 7, wherein each drive coil of the periodically repeating phase pattern is configured to be fed with the phase of the multi-phase excitation signal incrementally increasing in consecutive order of the drive coils of the periodically repeating phase pattern.

9. The displacement sensor according to claim 7, wherein the second conductive pattern of the rotor element comprises a series of receive coils being connected in series and extending along a measurement path of the rotor element, said measurement path of the rotor element facing the measurement path of the stator element.

10. The displacement sensor according to claim 9, wherein each receive coil of the series of receive coils is configured to define a periodically repeating alternating two-phase pattern which is repeated i-1 times along the measurement path of the rotor element so that adjacent loops of each receive coil of the series of receive coils are in anti-phase.

11. The displacement sensor according to claim 1, wherein the rotor element further comprises a balanced drive coil, the balanced drive coil being configured to be coupled to the second conductive pattern and to transmit the intermediate signal to a balanced receive coil of the stator element by mutual induction formed between the balanced drive coil and the balanced receive coil.

12. The displacement sensor according to claim 11, wherein each of the balanced drive coil and the balanced receive coil comprises two coil sections, and
wherein said two coil sections are configured so that currents flowing in said two coil sections flow in opposite directions in relation to each other along the measurement path of the rotor element and stator element respectively.

13. The displacement sensor according to claim 1, further comprising a signal generator circuit coupled to the first conductive pattern of the stator element, said signal generator circuit being configured to generate the excitation signal and provide the excitation signal to the first conductive pattern so as to energize said first conductive pattern.

14. The displacement sensor according to claim 1, wherein the phase detector circuit is an I/O demodulator circuit configured to output two quadrature signals indicative of a phase difference of said single phase receive signal and said reference signal.

15. The displacement sensor according to claim 1, wherein the rotor element is configured for attachment to a moveable part of the power tool and wherein the stator element is configured for attachment to a stationary part of the power tool.

16. The displacement sensor according to claim 1, wherein the rotor element and the stator element are shaped as annular discs.

17. The displacement sensor according to claim 1, wherein each of the rotor element and the stator element is formed of a printed circuit board with conductive traces forming the first conductive pattern and the second conductive pattern respectively.

18. The displacement sensor according to claim 1, wherein the rotor element comprises at least one capacitance component configured to provide noise suppression.

19. The displacement sensor according to claim 1, wherein the rotor element comprises at least one capacitance layer forming at least one capacitor so as to provide noise suppression.

20. A method for sensing displacement between two relatively moveable parts of a power tool, the method comprising:

generating an excitation signal, the excitation signal being a high-frequency excitation signal having substantially constant amplitude,
providing the excitation signal to a first conductive pattern of a stator element,
generating, in a second conductive pattern of a rotor element, an intermediate signal due to mutual induction between the first conductive pattern and the second conductive pattern, said intermediate signal being indicative of relative displacement between the rotor element and the stator element, and
processing a single phase receive signal to determine the relative displacement between the rotor element and the stator element in order to detect a phase difference between the single phase receive signal and a reference signal corresponding to the excitation signal.

21. The method according to claim 20, further comprising receiving the single phase receive signal, corresponding to the intermediate signal, at the stator element.

22. The method according to claim 20, further comprising transmitting the intermediate signal from a balanced drive coil of the rotor element coupled to the second conductive pattern.

23. The method according to claim 20, further comprising receiving the single phase receive signal, corresponding to the intermediate signal transmitted from a balanced drive coil of the rotor element, in a balanced receive coil of the stator element being mutually inductively coupled to the balanced drive coil of the rotor element.

24. The method according to claim 20, wherein the excitation signal is a high-frequency multi-phase excitation signal having substantially constant amplitude and a plurality of phases.

25. The method according to claim 24, wherein the multi-phase excitation signal comprises a 0 degree phase, a 90 degree phase, a 180 degree phase and a 270 degree phase.

26. The method according to claim 24, wherein the multi-phase excitation signal comprises a 0 degree phase, a 120 degree phase and a 240degree phase.

27. The method according to claim 24, further comprising:
arranging a series of drive coils extending along a measurement path of the stator element and forming the first conductive pattern of the stator element in a periodically repeating phase pattern which is repeated n times along the measurement path of the stator element, and
feeding each drive coil of the periodically repeating phase pattern with a phase of the multi-phase excitation signal.

28. The method according to claim 20, further comprising filtering the intermediate signal using an LC band pass filter so as to attenuate out of band noise.

29. The method according to claim 20, further comprising:
coupling the stator element to a stationary part of the power tool, and
coupling the rotor element to a moveable part of the power tool,
wherein said moveable part is moveable relative to said stationary part.

* * * * *